US010065369B2

(12) United States Patent
Guest et al.

(10) Patent No.: US 10,065,369 B2
(45) Date of Patent: Sep. 4, 2018

(54) TUNNEL SPRING STRUCTURES

(71) Applicant: NIKE, Inc., Beaverton, OR (US)

(72) Inventors: Stefan E. Guest, Portland, OR (US); Matthew J. Holmes, Portland, OR (US); Yoav Sterman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 29 days.

(21) Appl. No.: 15/370,913

(22) Filed: Dec. 6, 2016

(65) Prior Publication Data

US 2017/0156427 A1  Jun. 8, 2017

Related U.S. Application Data

(60) Provisional application No. 62/263,891, filed on Dec. 7, 2015, provisional application No. 62/263,916, filed
(Continued)

(51) Int. Cl.
*A41F 1/00* (2006.01)
*B29C 67/00* (2017.01)
(Continued)

(52) U.S. Cl.
CPC .......... *B29C 67/0059* (2013.01); *A41D 27/00* (2013.01); *A41F 1/00* (2013.01);
(Continued)

(58) Field of Classification Search
CPC ......... A41D 27/00; A41F 1/00; A43B 13/181; A43B 13/22; A43B 23/00; A43B 23/02; A43B 23/0245; A43B 23/24; A43B 3/26; A43C 11/16; A43C 1/00; A43C 1/04; A43C 1/06; A43C 5/00; A43C 7/00; A43D 1/02; A43D 8/22; B29C 64/00; B29C 64/106; B29C 64/112; B29C 64/165; B29C 64/386; B29C 67/0059; B29D 35/12;
(Continued)

(56) References Cited

U.S. PATENT DOCUMENTS 1,862,047 A * 6/1932 Boulet ..................... A43C 1/04
24/437
4,870,761 A  10/1987 Tracy
(Continued)

FOREIGN PATENT DOCUMENTS

WO    WO 93/25107    12/1993

OTHER PUBLICATIONS

International Search Report and Written Opinion, dated Jun. 28, 2017, for corresponding International Patent Application No. PCT/US2016/065181, 13 pages.
(Continued)

*Primary Examiner* — David M Upchurch
(74) *Attorney, Agent, or Firm* — Klarquist Sparkman, LLP

(57) ABSTRACT

A tunnel spring structure three-dimensionally printed on a base layer. The tunnel spring structure includes three tubular structures and two connecting portions. A connecting portion is disposed between two tubular structures. A tensile strand extends through the tubular structures. Tension applied to the tensile strand forces the tubular structures to adjoin due to the flexibility of the connection portions.

18 Claims, 33 Drawing Sheets

Related U.S. Application Data on Dec. 7, 2015, provisional application No. 62/263,923, filed on Dec. 7, 2015, provisional application No. 62/263,898, filed on Dec. 7, 2015, provisional application No. 62/263,834, filed on Dec. 7, 2015.

(51) Int. Cl.

| | | |
|---|---|---|
| *B33Y 10/00* | (2015.01) | |
| *B33Y 80/00* | (2015.01) | |
| *B29D 35/12* | (2010.01) | |
| *B41J 3/407* | (2006.01) | |
| *A43B 3/26* | (2006.01) | |
| *A43B 13/18* | (2006.01) | |
| *A43B 13/22* | (2006.01) | |
| *A43B 23/02* | (2006.01) | |
| *A43C 1/06* | (2006.01) | |
| *A43C 5/00* | (2006.01) | |
| *A43D 1/02* | (2006.01) | |
| *A43D 8/22* | (2006.01) | |
| *A41D 27/00* | (2006.01) | |
| *B33Y 50/02* | (2015.01) | |
| *A43B 23/00* | (2006.01) | |
| *A43B 23/24* | (2006.01) | |
| *A43C 1/00* | (2006.01) | |
| *A43C 1/04* | (2006.01) | |
| *A43C 7/00* | (2006.01) | |
| *A43C 11/16* | (2006.01) | |
| *B33Y 40/00* | (2015.01) | |
| *B29C 64/00* | (2017.01) | |
| *B29C 64/106* | (2017.01) | |
| *B29C 64/112* | (2017.01) | |
| *B29C 64/165* | (2017.01) | |
| *B29C 64/386* | (2017.01) | |
| *B29K 101/12* | (2006.01) | |
| *B29L 31/50* | (2006.01) | |
| *B29L 31/00* | (2006.01) | |

(52) U.S. Cl.
CPC ............. *A43B 3/26* (2013.01); *A43B 13/181* (2013.01); *A43B 13/22* (2013.01); *A43B 23/00* (2013.01); *A43B 23/02* (2013.01); *A43B 23/0245* (2013.01); *A43B 23/24* (2013.01); *A43C 1/00* (2013.01); *A43C 1/04* (2013.01); *A43C 1/06* (2013.01); *A43C 5/00* (2013.01); *A43C 7/00* (2013.01); *A43C 11/16* (2013.01); *A43D 1/02* (2013.01); *A43D 8/22* (2013.01); *B29C 64/00* (2017.08); *B29C 64/106* (2017.08); *B29C 64/112* (2017.08); *B29C 64/165* (2017.08); *B29C 64/386* (2017.08); *B29D 35/12* (2013.01); *B33Y 10/00* (2014.12); *B33Y 40/00* (2014.12); *B33Y 50/02* (2014.12); *B33Y 80/00* (2014.12); *B41J 3/4078* (2013.01); *B29K 2101/12* (2013.01); *B29K 2995/0082* (2013.01); *B29L 2031/505* (2013.01); *B29L 2031/727* (2013.01)

(58) Field of Classification Search
CPC ........ B29K 2101/12; B29K 2995/0082; B29L 2031/505; B29L 2031/727; B33Y 10/00; B33Y 40/00; B33Y 50/02; B33Y 80/00; B41J 3/4078
See application file for complete search history.

(56) References Cited

U.S. PATENT DOCUMENTS

| | | |
|---|---|---|
| 5,535,531 A | 7/1996 | Karabed et al. |
| 5,682,654 A | 11/1997 | Crowley et al. |
| D390,695 S * | 2/1998 | Prats .............................. D2/978 |
| 5,956,823 A * | 9/1999 | Borel ....................... A43C 3/00 24/130 |
| 6,032,387 A | 3/2000 | Johnson |
| 2003/0177662 A1 | 9/2003 | Elkington et al. |
| 2010/0175278 A1* | 7/2010 | Seliger ................. A43B 5/0401 36/117.1 |
| 2012/0302933 A1* | 11/2012 | Ostergard ............ A61F 5/0111 602/27 |
| 2012/0308805 A1 | 12/2012 | Sella |
| 2014/0020192 A1 | 1/2014 | Jones et al. |
| 2014/0067106 A1 | 3/2014 | Makeig |
| 2014/0196316 A1 | 7/2014 | Follet |
| 2014/0245638 A1 | 9/2014 | Seamarks et al. |
| 2014/0259783 A1 | 9/2014 | Dinndorf et al. |

OTHER PUBLICATIONS

"EnvisionTEC Unveils the WaxEra 3D Printer—DLP Printer that Prints on Wax," retrieved Jun. 12, 2017, https://3dprint.com/69344/envisiontec-wax-era/.

"High quality cable organizer," retrieved May 23, 2017, https://uedata.amazon.com/quality-organizer-coiled-sleeve-management/dp/B01081FTK6.

"Machine à relier Combbind C20 GBC," retrieved May 23, 2017, http://www.pro-machines-a-relier.com/perforelieuse-manuelle-multifonction-anneau-plastique-et-anneau-click-21-boucles-gbc-combbind-c20-330-feuilles/.

"The 3D Printing Revolution," *Bits and Pieces*, retrieved Jun. 12, 2017, http://busstopboutique.com/bits/2015/05/15024/.

* cited by examiner

TUNNEL SPRING STRUCTURES

CROSS-REFERENCE TO RELATED APPLICATIONS

This application claims the benefit of U.S. Provisional Application No. 62/263,916, filed on Dec. 7, 2015 and entitled "Article of Footwear with Tubular Structures," U.S. Provisional Application No. 62/263,923, filed Dec. 7, 2015 and entitled "Tunnel Spring Structures," U.S. Provisional Application No. 62/263,898, filed Dec. 7, 2015 and entitled "Article of Footwear with Tubular Structures Having Tab Portions," U.S. Provisional Application No. 62/263,834, filed Dec. 7, 2015 and entitled "Three-Dimensional Printing Utilizing a Captive Element," and U.S. Provisional Application No. 62/263,891, filed Dec. 7, 2015 and entitled "Segmented Tunnels on Articles," the disclosures of which are herein incorporated by reference in their entirety.

BACKGROUND

The present embodiments relate generally to spring structures.

Three-dimensional printing systems and methods may be associated with various technologies including fused deposition modeling (FDM), electron beam freeform fabrication (EBF), selective laser sintering (SLS), stereolithography, laminated object manufacturing (LOM) as well as other kinds of three-dimensional printing technologies.

Structures formed from three-dimensional printing systems can be used with objects formed by other manufacturing techniques. These include textile materials used in various articles of footwear and/or articles of apparel.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
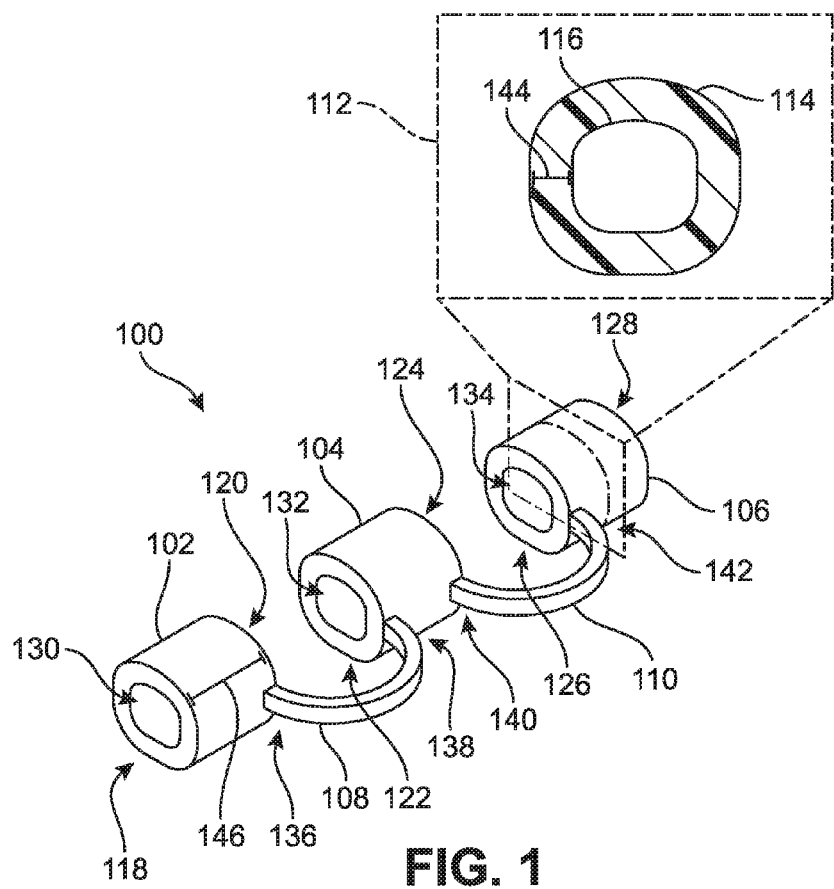
FIG. 1 is a schematic isometric view of an embodiment of a tunnel spring structure.

Certain aspects, advantages, and novel features of the embodiments of this disclosure are described herein in the context of various embodiments; however, the disclosed methods, systems, and apparatus are not limited to any specific aspect, feature, or combination thereof. For example, the embodiments may make use of any of the structures, components and/or methods as disclosed in U.S. Patent Application No. 62/263,916, filed Dec. 7, 2015, titled "Article of Footwear with Tubular Structures," the entirety of which is herein incorporated by reference (hereafter referred to as the "Articles with Tubular Structures application"). The embodiments may also make use of any of the structures, components and/or methods as disclosed in U.S. Patent Application No. 62/263,891, filed Dec. 7, 2015, titled "Segmented Tunnels on Articles," the entirety of which is herein incorporated by reference. The embodiments may make use of any of the structures, components and/or methods as disclosed in U.S. Patent Application No. 62/263,898, filed Dec. 7, 2015, titled "Article of Footwear with Tubular Structures Having Tab Portions," the entirety of which is herein incorporated by reference (hereafter referred to as the "Articles with Tubular Structures and Tab Portions application").

In one aspect, a tunnel spring structure is attached to a base layer, where the tunnel spring structure includes a plurality of tubular structures with each tubular structure having a tunnel. The tunnel spring structure further includes a plurality of connection portions. The plurality of tubular structures and the plurality of connecting portions are attached in alternating order in series. One of the plurality of tubular structures is attached to one of the plurality of connecting portions and another plurality of tubular structures is attached to the one of the plurality of connecting portions, and where each connecting portion is disposed between two tubular structures.

In one aspect, a tunnel spring structure is attached to a base layer, where the tunnel spring structure includes a plurality of tubular structures with each tubular structure having a tunnel. The tunnel spring structure further includes a plurality of connection portions. The plurality of tubular structures and the plurality of connecting portions are attached in alternating order in series. One of the plurality of tubular structures is attached to one of the plurality of connecting portions and another plurality of tubular structures is attached to the one of the plurality of connecting portions, and where each connecting portion is disposed between two tubular structures.

In another aspect, a tunnel spring structure is attached to a base layer. The tunnel spring structure includes a first tubular structure, a second tubular structure, a third tubular structure, a first connecting portion, a second connecting portion, and a tensile strand. The first tubular structure is attached to the base layer including a first end portion and a second end portion. The first tubular structure has a first tunnel extending from the first end portion to the second end portion. The second tubular structure attached to the base layer includes a third end portion and a fourth end portion. The second tubular structure has a second tunnel extending from the third end portion to the fourth end portion. The third tubular structure attached to the base layer includes a fifth end portion and a sixth end portion. The third tubular structure has a third tunnel extending from the fifth end portion to the sixth end portion. The first connecting portion is disposed between the first tubular structure and the second tubular structure. The first connecting portion is attached to the second end portion of the first tubular structure and the third end portion of the second tubular structure. The second connecting portion is disposed between the second tubular structure and the third tubular structure. The second connecting portion is attached to the fourth end portion of the second tubular structure and the fifth end portion of the third tubular structure. The tensile strand includes a first end and second end. The tensile strand extends through the first tunnel, the second tunnel, and the third tunnel. The tensile strand is partially exposed proximate the first connecting portion and is also partially exposed proximate the second connecting portion.

In another aspect, a method of forming a tunnel spring system coupled with a base layer, comprising printing a first tubular structure including a first end and a first opposite end. Then printing a second tubular structure including a second end and a second opposite end. Then printing a third tubular structure including a third end and a third opposite end, wherein the first tubular structure, the second tubular structure, and the third tubular structure are sequentially arranged on the base layer. Each tubular structure has a tunnel. Then printing a first connecting portion so that the first connecting portion attaches to the first opposite end of the first tubular structure and the second end of the second tubular structure. Then printing a second connecting portion so that the second connecting portion attaches to the second opposite end of the second tubular structure and the third end of the third tubular structure.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

FIG. 1 illustrates a schematic isometric view of an embodiment of tunnel spring structure 100. Tunnel spring structure 100 may further comprise a plurality of discrete or disjoint tubular structures. As used herein, the term "tubular structure" refers to a tubular structure having a structure with a hollow tunnel extending through the structure. In the exemplary embodiment of FIG. 1, tunnel spring structure 100 is seen to include three tubular structures: first tubular structure 102, second tubular structure 104, and third tubular structure 106.

Each tubular structure may include two ends with a tunnel extending between the two ends. For example, first tubular structure 102 includes first end 118 and second end 120. First tunnel 130 extends through first tubular structure 102 between first end 118 and second end 120. Second tubular structure 104 includes first end 122 and second end 124. Second tunnel 132 extends through second tubular structure 104 between first end 122 and second end 124. Third tubular structure 106 includes first end 126 and second end 128. Third tunnel 134 extends through third tubular structure 106 between first end 126 and second end 128.

FIG. 1 also shows cross-section view 112 of an exemplary tubular structure. Third tubular structure 106 may include outer surface 114 and inner surface 116. Outer surface 114 extends between first end 126 and second end 128. Similarly, inner surface 116 extends between first end 126 and second end 128. Inner surface 116 bounds the third tunnel 134.

Any of the tubular structures of tunnel spring structure 100 may have any shape. FIG. 1 shows third tubular structure 106 as having a rounded outer cross-sectional geometry. Third tubular structure 106 could have outer cross-sectional geometries that are approximately rectangular or polygonal, ovoid, symmetrical, non-symmetrical or other geometries that need not be circular or approximately circular. Also, FIG. 1 shows third tubular structure 106 as having a rounded inner cross-sectional geometry. Third tubular structure 106 could have inner cross-sectional geometries that are approximately rectangular or polygonal, ovoid, symmetrical, non-symmetrical or other geometries that need not be circular or approximately circular. In some embodiments, each tubular structure of the tunnel spring structure could have the same shape. In other embodiments, every other tubular structure could have the same shape. Further, in other embodiments, each tubular structure could have a different shape. Any of the tubular structures can have these same provisions, and in some embodiments, the three tubular structures are identical in geometry. The structure, design, material(s), and construction for the tubular structures may be selected, including a number and configuration of tubular structures that is suitable for a desired type of article of footwear and/or article of apparel and intended use.

Any of the tubular structures of tunnel spring structure 100 may have any size. FIG. 1 shows first tubular structure 102 having axial length 146. Axial length 146 extends between first end 118 and second end 120 and could have a value in the range between 5.0 mm and 5.0 cm. In different embodiments, the outer diameter of a tubular structure could have any value in the range between 0.1 mm and 2 cm. Likewise, cross-section view 112 shows tubular structure thickness 144, characterized by the distance between the outer surface 114 and inner surface 116. Tubular structure thickness 144 could have any value in the range between 0.5 mm and 2.0 cm. It may be appreciated that the tunnel diameter may vary in accordance with the tubular structure thickness (i.e., the tunnel diameter is the diameter of the tubular structure minus twice the tubular structure thickness). Moreover, axial length, the outer diameter, and tubular structure thickness for a tubular structure may be selected according to various factors including desired tensile strand diameter, desired flexibility of the tubular structure, desired height of the tubular structure relative to an article of footwear and/or article of apparel as well as possibly other factors.

Any of the tubular structures can be configured with various physical properties. Exemplary physical properties of the tubular structures that could be varied include rigidity, strength, and flexibility or elasticity. In some embodiments, for example, any of the tubular structures could be configured as relatively rigid with little flexibility. In other embodiments, any of the tubular structures may be configured with some flexibility such that any of the tubular structures can undergo elastic deformation during tensioning.

Tunnel spring structure 100 may include provisions for connecting separate tubular structures. Some embodiments may include a plurality of connecting portions, where each connecting portion connects two nearby or adjacent tubular structures.

First connecting portion 108 has first end 136 connected to first tubular structure 102 and second end 138 connected to second tubular structure 104. First connecting portion 108 may be a hinge structure having an elastic or flexible characteristic. In some embodiments, first connecting portion 108 could flex so that first tubular structure 102 and second tubular structure 104 move closer together or farther apart. Second connecting portion 110 has first end 140 connected to second tubular structure 104 and second end 142 connected to third tubular structure 106. Second connecting portion 110 may be a hinge structure having an elastic or flexible characteristic. In some embodiments, second connecting portion 110 could flex so that second tubular structure 104 and third tubular structure 106 move closer together or farther apart.

Figure 2:
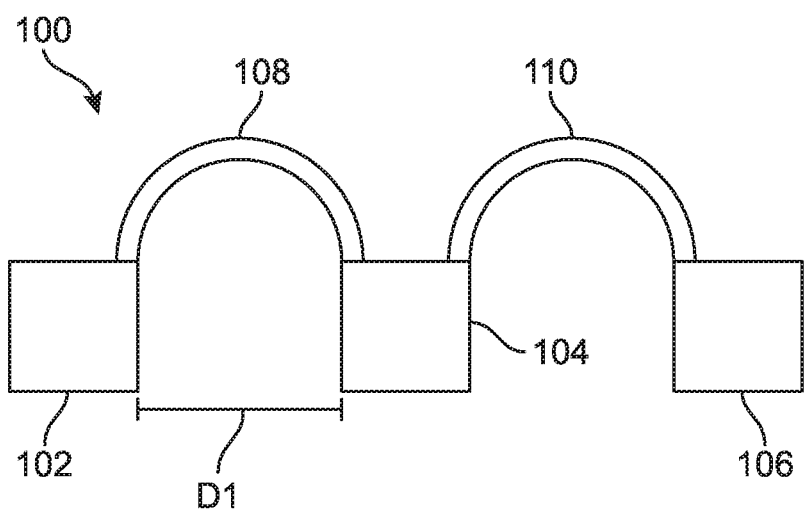
FIG. 2 is a schematic side view of the tunnel spring structure of FIG. 1 in a first state.

FIG. 2 is a schematic side view of the tunnel spring structure 100 of FIG. 1 in a first state or rest position. First tubular structure 102 is spaced a first predetermined distance D1 from second tubular structure 104. First predetermined distance D1 could be determined by the length of first connecting portion 108. For example, first predetermined distance D1 could be in the range of 5.0 mm to 3.0 cm. Similarly, the distance between second tubular structure 104 and third tubular structure 106 could be a first predetermined distance determined by the length of second connecting portion 110. The predetermined distance between first tubular structure 102 and second tubular structure 104 could be the same as the predetermined distance between second tubular structure 104 and third tubular structure 106. The predetermined distance between each tubular structure could also be different from one another.

Figure 3:
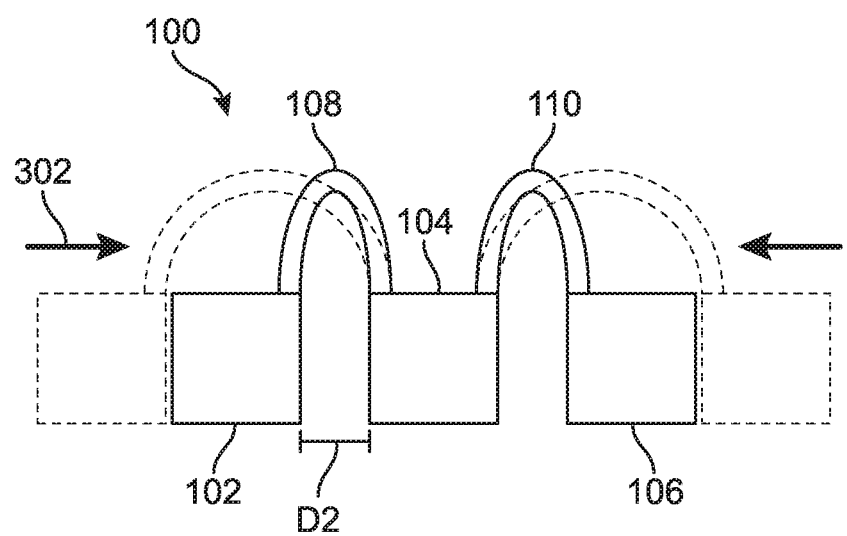
FIG. 3 is a schematic side view of the tunnel spring structure of FIG. 1 in a second state.

FIG. 3 is a schematic side view of the tunnel spring structure 100 of FIG. 1 in a second state or biased position. First tubular structure 102 is spaced a second predetermined distance D2 from second tubular structure 104. Second predetermined distance D2 could be determined by the length of the contracted first connecting portion 108. For example, second predetermined distance D2 could be less than first predetermined distance D1. Similarly, the distance between second tubular structure 104 and third tubular structure 106 could be a second predetermined distance determined by the length of contracted second connecting portion 110.

Also shown in FIG. 3 is reactive force 302, which enables the connecting portions to contract. For example, in different embodiments, the geometry of the connecting portions change due to reactive force 302. In some embodiments, the connecting portions may be configured with some flexibility such that any of the connecting portions can undergo elastic deformation during tensioning. Upon elastic deformation of the connecting portions, the tubular structures move closer together.

Different embodiments could utilize different materials for any of the tubular structures and any of the connecting portions. Exemplary materials may include, but are not limited to, various kinds of polymers. In embodiments where a tubular structure and a connecting portion may be formed by a 3D printing process, the tubular structure and the connecting portion could be made of materials including, but not limited to, thermoplastics (e.g., PLA and ABS) and thermoplastic powders, high-density polyurethylene, eutectic metals, rubber, modeling clay, plasticine, RTV silicone, porcelain, metal clay, ceramic materials, plaster and photopolymers, flexible and castable resin, nylon powder, polyester-based filament as well as possibly other materials known for use in 3D printing. Such materials may be herein referred to as "printable materials."

Figure 4:
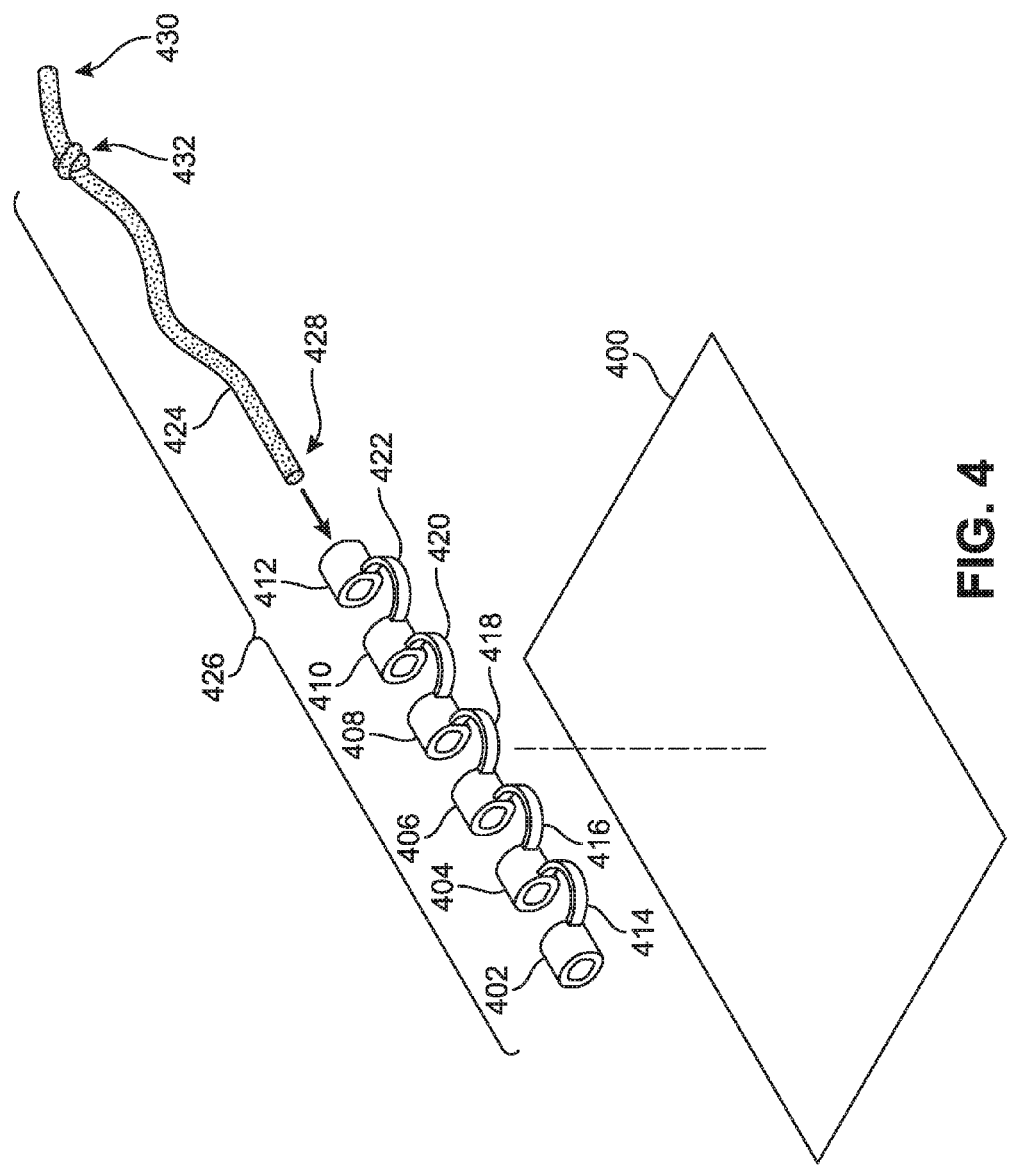
FIG. 4 is a schematic view of an embodiment of a tunnel spring structure and a base layer.

FIG. 4 is a schematic view of an embodiment of tunnel spring structure 426 and base layer 400. Tunnel spring structure 426 has first tubular structure 402, second tubular structure 404, third tubular structure 406, fourth tubular structure 408, fifth tubular structure 410, and sixth tubular structure 412. Tunnel spring structure 426 also has first connecting portion 414, second connecting portion 416, third connecting portion 418, fourth connecting portion 420, and fifth connecting portion 422. A tubular structure and connecting portion are arranged in alternating order. A connecting portion is attached between two tubular structures. Although, six tubular structures and five connecting portions are shown, any number of tubular structures and connecting portions could be connected in alternating order to form a tunnel spring structure.

Tunnel spring structure 426 is positioned to receive tensile strand 424. As used herein, the term "tensile strand" refers to any elongated (e.g., approximately two dimensional) element capable of transferring tension across its length. Examples of various kinds of tensile strands that could be used with the embodiments include, but are not limited to, cords, laces, wires, cables, threads, ropes, filaments, yarns as well as possibly other kinds of strands. Tensile strands may be configured with different strengths as well as different degrees of stretch or elasticity.

Tensile strand 424 may comprise a cord-like element having an approximately rounded cross section. Tensile strand 424 includes first end portion 428 and second end portion 430. Although the length of tensile strand 424 could vary from one embodiment to another, in an exemplary embodiment, tensile strand 424 may be longer than tunnel spring structure 426 so that first end portion 428 and second end portion 430 extend outwardly from first tubular structure 402 and sixth tubular structure 412, respectively, of tunnel spring structure 426.

In some embodiments, tensile strand 424 may include provisions to prevent either first end portion 428 or second end portion 430 from being pulled into tunnel spring structure 426. Such an element may be herein referred to as a catching element or anchoring element. Catching elements could include knots formed in a tensile strand or other elements that clamp or tie onto the tensile strand. A catching element may generally have a cross-sectional size and/or shape that prevents the catching element from being pulled into a tubular structure. Instead, the catching element may press against the end of the tubular structure thereby allowing the other end of the tensile strand to be pulled for generating tension across the tensile strand.

FIG. 4 shows catching element 432 of tensile strand 424 that prevents second end portion 430 from being pulled into tunnel spring structure 426. Catching element 432 could also be located closer to first end portion 428 when second end portion 430 is inserted into tunnel spring structure 426 at first tubular structure 402.

In some embodiments, printed structures may be printed directly to one or more articles. The term "articles" is intended to include articles of footwear (e.g., shoes) and articles of apparel (e.g., shirts, pants, etc.), as well as protective gear and other articles of manufacture. As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

The disclosed embodiments may further be equally applied to any article of clothing, apparel, or gear that bears additive components. For example, the disclosed embodiments may be applied to hats, caps, shirts, jerseys, jackets, socks, shorts, pants, scarves, undergarments, athletic support garments, gloves, wrist/arm bands, sleeves, headbands, sweatshirts, hoodies, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, scarves, undergarments, athletic support garments, gloves, wrist/arm bands, sleeves, headbands, sweatshirts, hoodies, any knit material, any woven material, any nonwoven material, etc. As used throughout this disclosure, the terms "article of apparel," "apparel," "article of footwear," and "footwear" may also refer to a textile, natural fabric, synthetic fabric, any three-dimensional printed material, recycled materials, knit, woven material, nonwoven material, mesh, leather, synthetic leather, polymer, rubber, and foam. Base layer 400 could comprise a portion of any of these various kinds of articles.

Figure 5:
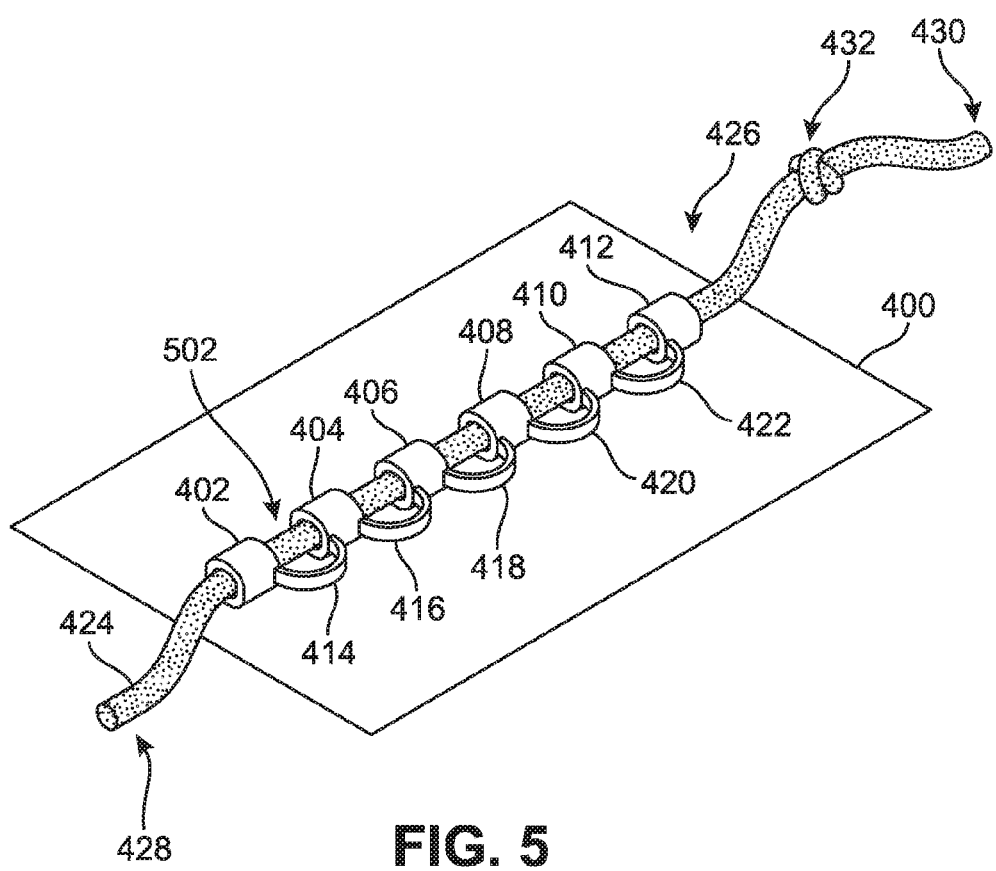
FIG. 5 is a schematic view of an embodiment of a tunnel spring structure coupled on a base layer.

FIG. 5 is a schematic view of an embodiment of tunnel spring structure 426 on base layer 400. In some embodiments, tunnel spring structure 426 could be attached to base layer 400 with an adhesive or other form of attaching mechanism. In other embodiments, tunnel spring structure 426 could be stitched or sewed onto base layer 400. In an exemplary embodiment, first tubular structure 402, second tubular structure 404, third tubular structure 406, fourth tubular structure 408, fifth tubular structure 410, and sixth tubular structure 412 could be printed, using a three-dimensional printing system, onto base layer 400. Various methods of printing the tubular structures will be described with reference to FIGS. 17-24.

In some embodiments, first connecting portion 414, second connecting portion 416, third connecting portion 418, fourth connecting portion 420, and fifth connecting portion 422 could be three-dimensionally printed onto base layer 400 so that they are flush or positioned along a similar longitudinal axes with first tubular structure 402, second tubular structure 404, third tubular structure 406, fourth tubular structure 408, fifth tubular structure 410, and sixth tubular structure 412. In other embodiments, first connecting portion 414, second connecting portion 416, third connecting portion 418, fourth connecting portion 420, and fifth connecting portion 422 could be printed onto base layer 400, so that they protrude outward or away from base layer 400.

Tensile strand 424 may extend through first tubular structure 402, second tubular structure 404, third tubular structure 406, fourth tubular structure 408, fifth tubular structure 410, and sixth tubular structure 412 as shown in FIG. 5. Tensile strand 424 may be partially exposed proximate the connecting portions. For example, portion 502 of tensile strand 424 is seen to be exposed in the region between tubular structure 402 and tubular structure 404.

In another embodiment, tensile strand 424 could be laid down onto base layer 400. Then, first tubular structure 402, second tubular structure 404, third tubular structure 406, fourth tubular structure 408, fifth tubular structure 410, and sixth tubular structure 412 could be three-dimensionally printed around and over tensile strand 424. First connecting portion 414, second connecting portion 416, third connecting portion 418, fourth connecting portion 420, and fifth connecting portion 422 could be three-dimensionally printed onto base layer 400 so that they are flush or positioned along a similar longitudinal axes with first tubular structure 402, second tubular structure 404, third tubular structure 406, fourth tubular structure 408, fifth tubular structure 410, and sixth tubular structure 412. In other embodiments, first connecting portion 414, second connecting portion 416, third connecting portion 418, fourth connecting portion 420, and fifth connecting portion 422 could be printed onto base layer 400, so that they protrude outward or away from base layer 400.

Figure 6:
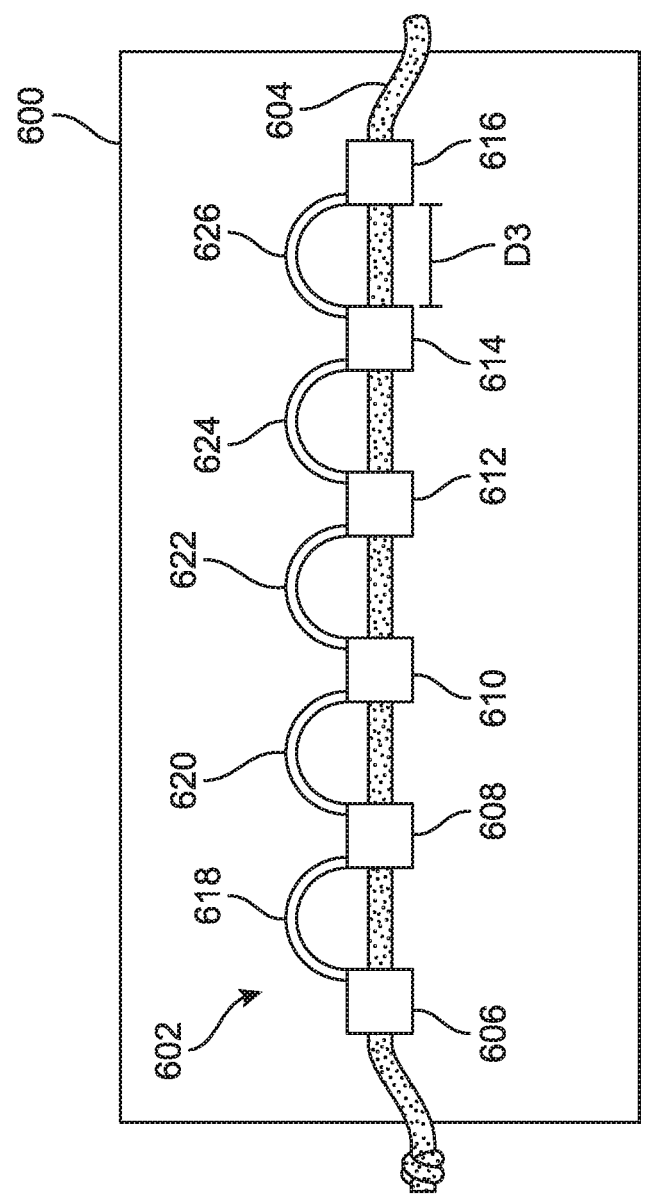
FIG. 6 is an isometric view of an embodiment of a tunnel spring structure in a first state.

FIG. 6 is an isometric view of an embodiment of tunnel spring structure 602 in a first state or rest position. Tunnel spring structure 602 is attached to base layer 600. In some embodiments, three tubular structures and two connecting portions could be connected to form a tunnel spring structure. In other embodiments, multiple tubular structures and multiple connecting portions could be connected to form a tunnel spring structure. The number of tubular structures and connecting portions could be determined based on the location of the tunnel spring structure on the article of footwear and/or the article of apparel. In an embodiment, shown in FIG. 6, tunnel spring structure 602 includes first tubular structure 606, second tubular structure 608, third tubular structure 610, fourth tubular structure 612, fifth tubular structure 614, and sixth tubular structure 616, and first connecting portion 618, second connecting portion 620, third connecting portion 622, fourth connecting portion 624, and fifth connecting portion 626 arranged in alternating order with tensile strand 604 extending through the tubular structures. As shown in FIG. 6, the tubular structures could be spaced apart by first predetermined distance D3 in the first state or rest position. Similarly, the predetermined distance between the other tubular structures could be the same as D3.

Figure 7:
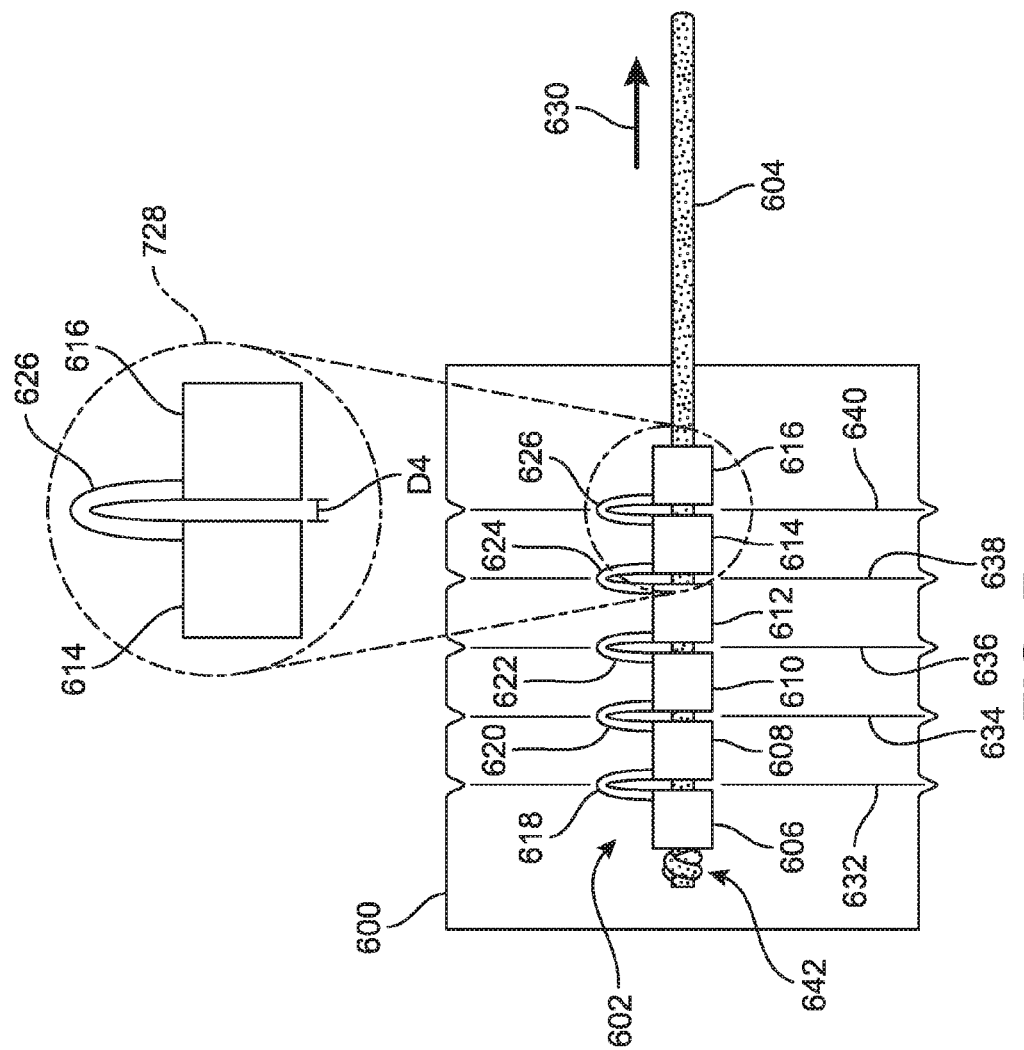
FIG. 7 is an isometric view of an embodiment of a tunnel spring structure in a second state.

FIG. 7 is an isometric view of an embodiment of tunnel spring structure 602 in a second state or biased position. Tunnel spring structure 602 is attached to base layer 600. Tension could be applied to tensile strand 604, shown by arrow 630. Upon application of tension, first tubular structure 606, second tubular structure 608, third tubular structure 610, fourth tubular structure 612, fifth tubular structure 614, and sixth tubular structure 616 are forced or urged closer together due to the flexible characteristic of first connecting portion 618, second connecting portion 620, third connecting portion 622, fourth connecting portion 624, and fifth connecting portion 626. As shown in call out 728, fifth connecting portion 626 elastically deforms when tension is applied to tensile strand 604. In the second state, fifth tubular structure 614 and sixth tubular structure 616 are spaced apart by distance D4. Similarly, in the second state, the distance between the other tubular structures will be less than first predetermined distance D3.

As shown in FIG. 7, as tension is applied on tensile strand 604, tunnel spring structure 602 shifts to the second state or biased position. Catching element 642 could be anchored at first tubular structure 606 urging second tubular structure 608 closer to first tubular structure 606 due to the flexible characteristics of first connecting portion 618. Base layer 600 could form first cinch 632 as first tubular structure 606 and second tubular structure 608 are urged closer together due to the flexibility of first connecting portion 618. Base layer 600 could form second cinch 634 as second tubular structure 608 and third tubular structure 610 are urged closer together due to the flexibility of second connecting portion 620. Base layer 600 could form third cinch 636 as third tubular structure 610 and fourth tubular structure 612 are urged closer together due to the flexibility of third connecting portion 622. Base layer 600 could form fourth cinch 638 as fourth tubular structure 612 and fifth tubular structure 614 are urged closer together due to the flexibility of fourth connecting portion 624. Base layer 600 could form fifth cinch 640 as fifth tubular structure 614 and sixth tubular structure 616 are urged closer together due to the flexibility of fifth connecting portion 626. Shifting tunnel spring structure 602 from a first state to a second state could provide an adjustable fit for the wearer.

Figure 8:
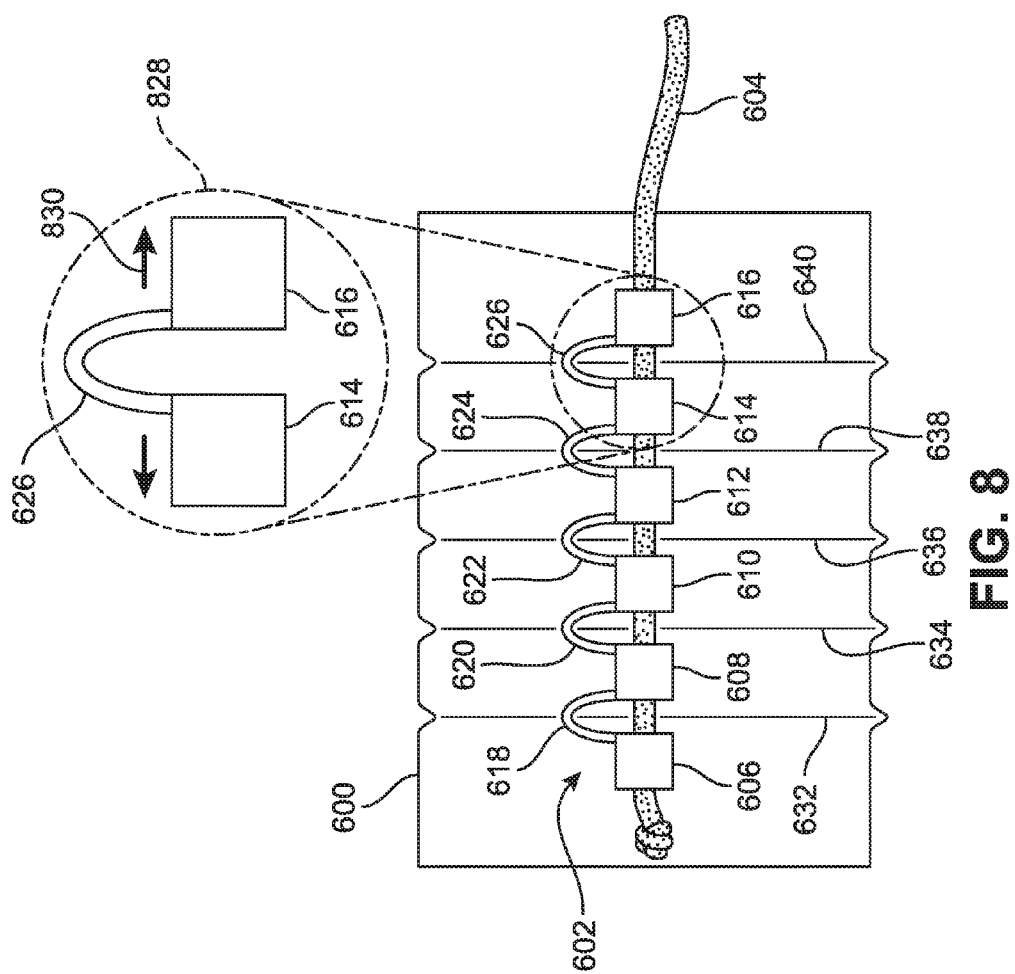
FIG. 8 is an isometric close-up view of an embodiment of a connecting portion.

FIG. 8 is an isometric view of an embodiment of tunnel spring structure 602 returning to the first state or rest position. As tension is released from tensile strand 604, first tubular structure 606, second tubular structure 608, third tubular structure 610, fourth tubular structure 612, fifth tubular structure 614, and sixth tubular structure 616 are urged to the first state due to the flexible characteristic of first connecting portion 618, second connecting portion 620, third connecting portion 622, fourth connecting portion 624, and fifth connecting portion 626. As shown in call out 828, fifth connecting portion 626 expands when tension is released from tensile strand 604, returning fifth tubular structure 614 and sixth tubular structure 616 to the first state. The expansion of fifth connecting portion is shown by arrows 830.

Figure 9:
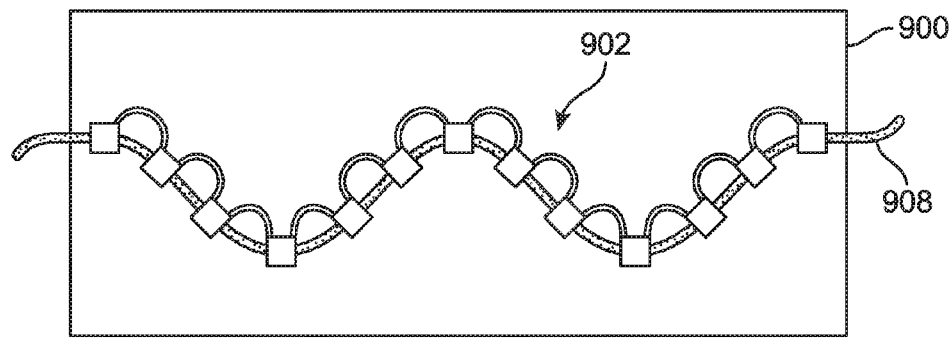
FIG. 9 is a schematic isometric view of an embodiment of a tunnel spring structure arranged in a wave pattern in a first state.
Figure 10:
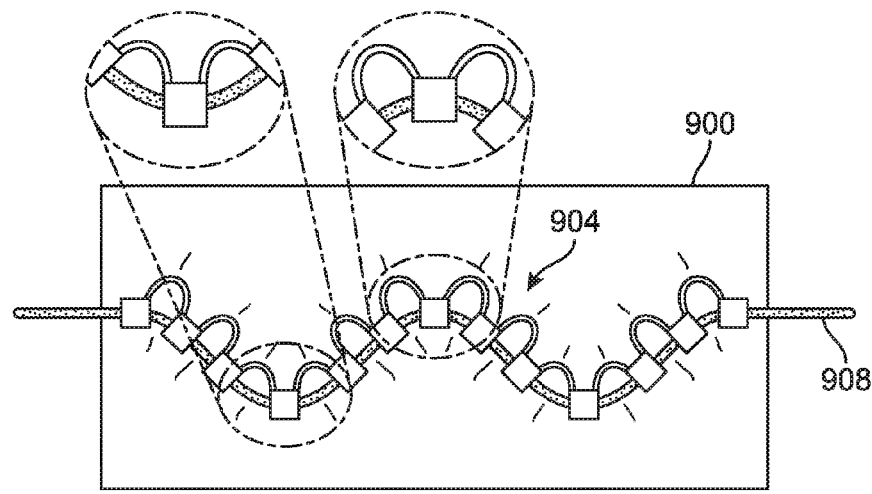
FIG. 10 is a schematic isometric view of an embodiment of a tunnel spring structure of FIG. 9 arranged in a wave pattern in a second state.
Figure 11:
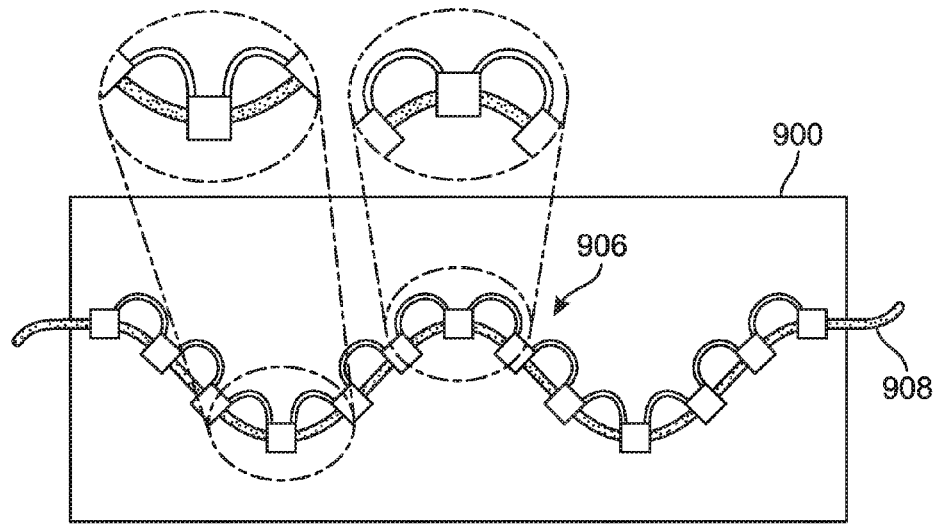
FIG. 11 is a schematic isometric view of an embodiment of a tunnel spring structure of FIG. 9 arranged in a wave pattern returning to a first state.

A tunnel spring structure could have varying designs and shapes. As shown in the embodiments of FIGS. 5-8, a tunnel spring structure could be arranged linearly, or in a straight line. In other embodiments, a tunnel spring structure could be arranged in a serpentine shape, zigzag shape, triangular, irregular, geometric, or any other kind of shape. Also, multiple tunnel spring structures could be arranged together or intertwined depending on the desired or intended use. As shown in FIG. 9, in some embodiments, tunnel spring structure 902 is arranged in a wave pattern on base layer 900. Tunnel spring structure 902 is shown in a first state when there is no tension applied to tensile strand 908. FIG. 10 shows tunnel spring structure 904 in a second state when tension is applied to tensile strand 908. The connecting portions flex to urge tubular structures closer together. FIG. 11 shows tunnel spring structure 906 returning to the first state as tension is released from tensile strand 908. The connecting portions are no longer flexed and the tubular structures shift to the first state.

Figure 12:
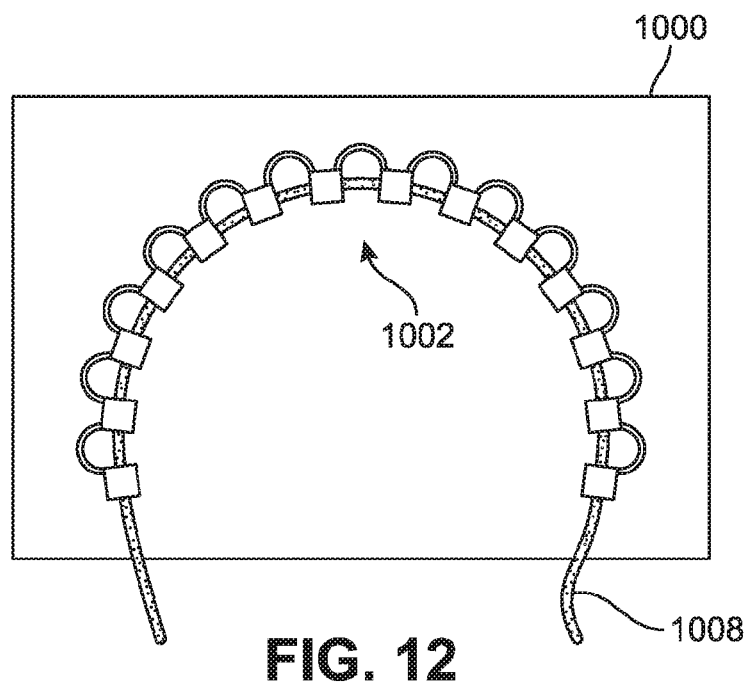
FIG. 12 is a schematic isometric view of an embodiment of a tunnel spring structure arranged in an arch in a first state.
Figure 13:
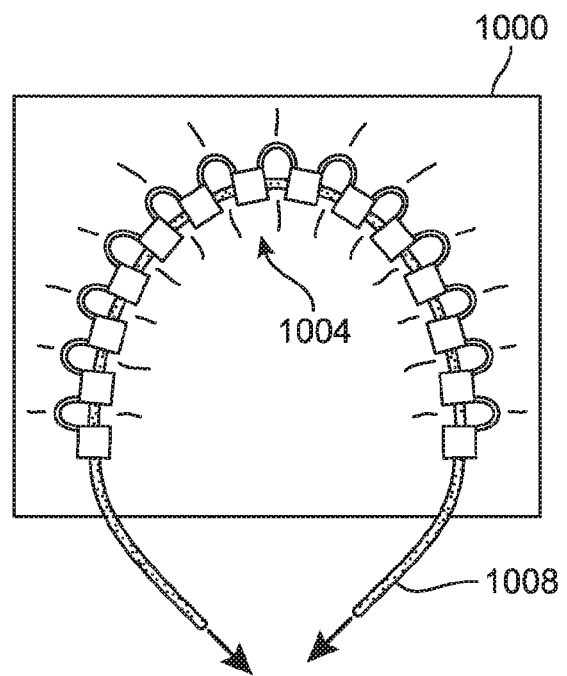
FIG. 13 is a schematic isometric view of an embodiment of a tunnel spring structure of FIG. 12 arranged in an arch in a second state.

In other embodiments, as shown in FIGS. 12 and 13, tunnel spring structure 1002 is arranged in an arc-like shape on base layer 1000. FIG. 12 shows tunnel spring structure 1002 in a first state or rest position when there is no tension applied to tensile strand 1008. FIG. 13 shows tunnel spring structure 1004 in a second state or biased position when tension is applied to tensile strand 1008. As tension is applied by pulling on both ends of tensile strand 1008, connecting portions flex to urge tubular structures closer together.

In other embodiments, the tunnel spring structure could be formed of any variety of nonlinear paths to be able to form nonlinear paths for the structure and tensile strand. A nonlinear path of the tunnel spring structure could allow the tensile strand to be arranged in various nonlinear paths on articles to provide targeted support or tensioning, such as around bony structures. Also, nonlinear paths of the tunnel spring structure allow the path of the tensile strand to deviate around regions where you don't want the tensile strand passing through, such as pressure points underlying an article.

Figure 14:
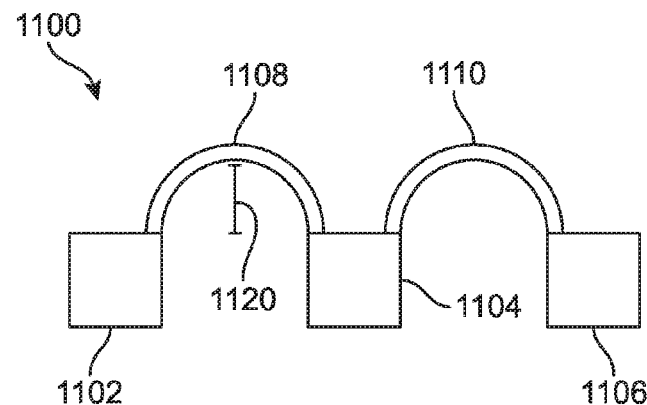
FIG. 14 is a schematic view of an embodiment of a connecting portion having a high arch.
Figure 15:
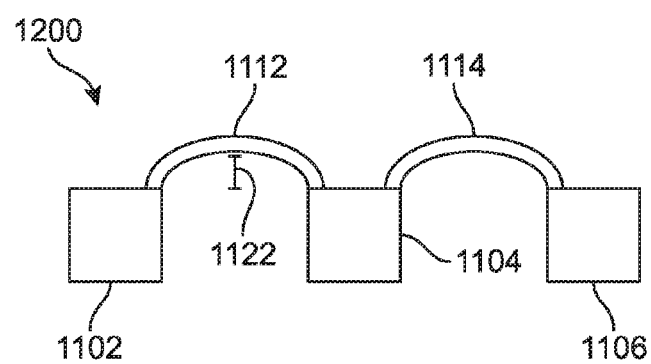
FIG. 15 is a schematic view of an embodiment of a connecting portion having a medium arch.
Figure 16:
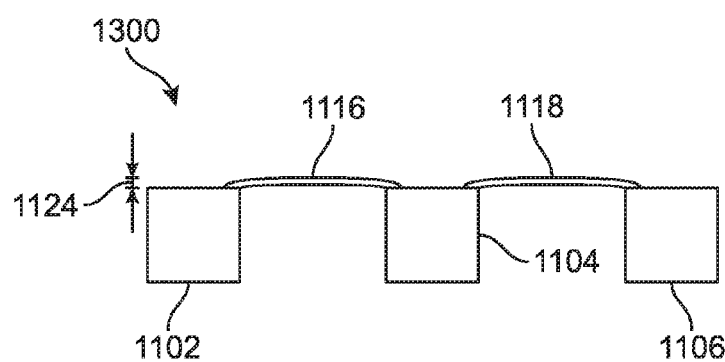
FIG. 16 is a schematic view of an embodiment of a connecting portion with a low arch.

A tunnel spring structure includes tubular structures and connecting portions. FIGS. 14-16 show varying geometries of the connecting portions in the tunnel spring structures. In some embodiments, tunnel spring structure 1100 includes first connecting portion 1108 and second connecting portion 1110 have a high arch. First connecting portion 1108 extends away from first tubular structure 1102 and second tubular structure 1104. Distance 1120 measures the height of the arch. Distance 1120 is measured from the point of connection of first tubular structure 1102 and first connecting portion 1108 to the highest point of the arch. Second connecting portion 1110 extends away from second tubular structure 1104 and third tubular structure 1106. In some embodiments, the height of the arch of first connecting portion 1108 could be the same as the height of the arch of second connecting portion 1110. In other embodiments, the height of the arch of first connecting portion 1108 could be different from the height of the arch of second connecting portion 1110.

In other embodiments, as shown in FIG. 15, tunnel spring structure 1200 includes first connecting portion 1112 and second connecting portion 1114 have a medium arch. First connecting portion 1112 extends away from first tubular structure 1102 and second tubular structure 1104. Distance 1122 measures the height of the arch. Distance 1122 is measured from the point of connection of first tubular structure 1102 and first connecting portion 1112 to the highest point of the arch. Second connecting portion 1114 extends away from second tubular structure 1104 and third tubular structure 1106. In some embodiments, the height of the arch of first connecting portion 1112 could be the same as the height of the arch of second connecting portion 1114. In other embodiments, the height of the arch of first connecting portion 1112 could be different from the height of the arch of second connecting portion 1114.

Further, in other embodiments, as shown in FIG. 16, tunnel spring structure 1300 includes first connecting portion 1116 and second connecting portion 1118 have a low arch. First connecting portion 1116 extends away from first tubular structure 1102 and second tubular structure 1104. Distance 1124 measures the height of the arch. Distance 1124 is measured from the point of connection of first tubular structure 1102 and first connecting portion 1116 to the highest point of the arch. Second connecting portion 1118 extends away from second tubular structure 1104 and third tubular structure 1106. In some embodiments, the height of the arch of first connecting portion 1116 could be the same as the height of the arch of second connecting portion 1118. In other embodiments, the height of the arch of first connecting portion 1116 could be different from the height of the arch of second connecting portion 1118.

The connecting portions could be formed of any geometry. A particular geometry could provide different levels of flexibility. For example, connecting portions with greater arch heights could flex more than connecting portions with shorter arch heights.

Figure 17:
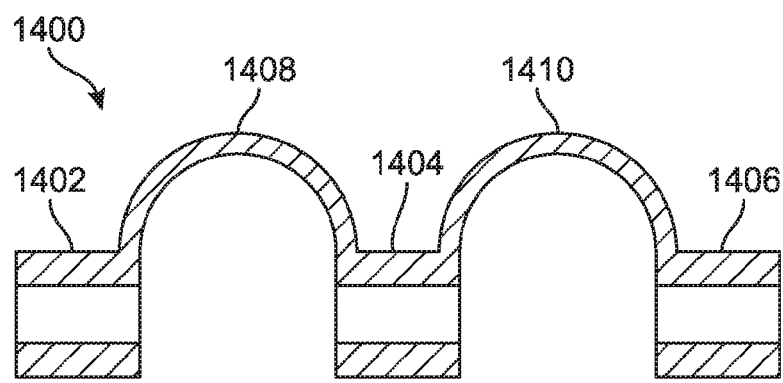
FIG. 17 is a schematic view of an embodiment of a tunnel spring structure with the tubular structure and the connecting portion being the same material.

A tunnel spring structure could have varying materials depending on the desired and intended use. In some embodiments, as shown in FIG. 17, a cross section view of tunnel spring structure 1400 includes first tubular structure 1402, second tubular structure 1404, and third tubular structure 1406, having the same material as first connecting portion 1408 and second connecting portion 1410. For example, each component could be a partially flexible thermoplastic polymer.

Figure 18:
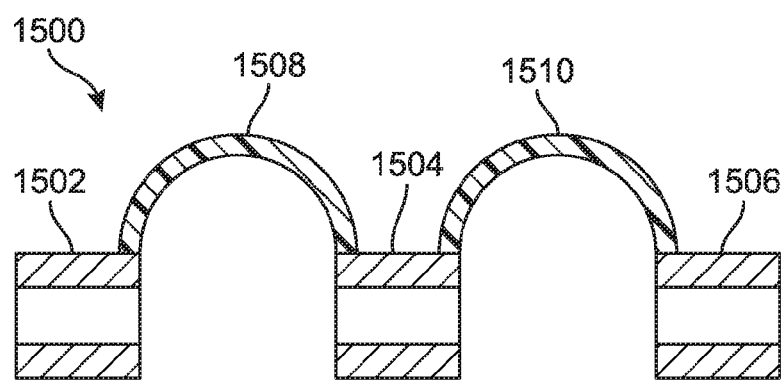
FIG. 18 is a schematic view of an embodiment of a tunnel spring structure with the tubular structure and the connecting portion being different materials.

In other embodiments, FIG. 18 shows a cross-sectional view of tunnel spring structure 1500. Tunnel spring structure 1500 includes first tubular structure 1502, second tubular structure 1504, and third tubular structure 1506 having a different material from the material of first connecting portion 1508 and second connecting portion 1510. For example, first tubular structure 1502, second tubular structure 1504, and third tubular structure 1506 could be a rigid thermoplastic polymer. Also, first connecting portion 1508 and second connecting portion 1510 could be a flexible elastic resin material. It will be understood that the tubular structures and the connecting portions could be made of any of the materials previously described for the tunnel spring structure.

The connecting portions could be made to have varying degrees of flexibility. In some instances, it will be desired to have a more flexible connecting portion to enable the wearer to tighten the article for a more compressed fit. In other instances, it will be desired to have a less flexible connecting portion to enable the wearer to slightly tighten the article for more precise support.

Figure 19:
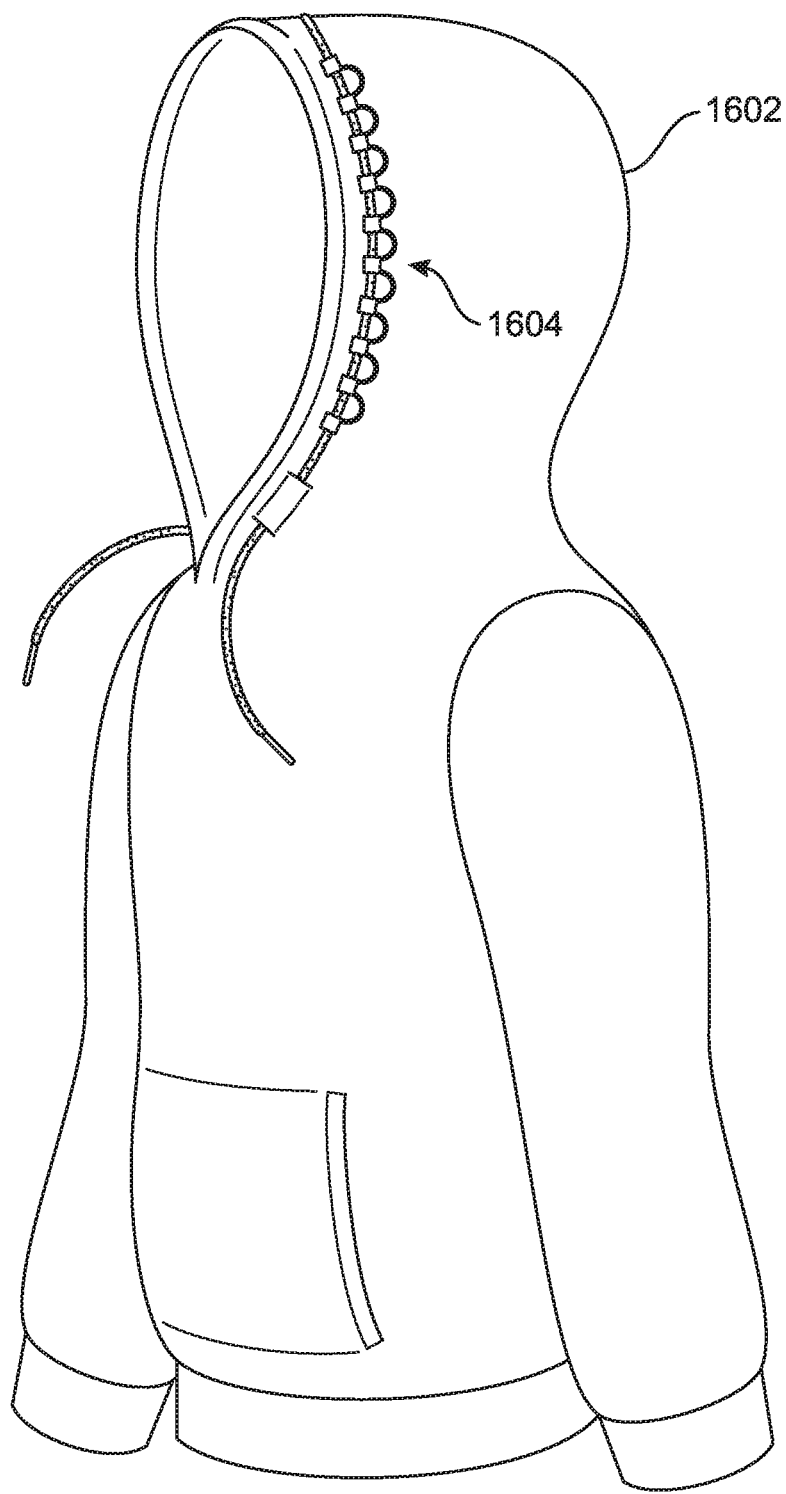
FIG. 19 illustrates an embodiment of a tunnel spring structure used on an article of apparel.

In some embodiments, as shown in FIG. 19, tunnel spring structure 1604 is used on article of apparel 1602. For example, tunnel spring structure 1604 could be attached directly to the hood portion of article of apparel 1602. When tension is applied to the tensile strand, in this case, to both ends of the tensile strand, the tubular structures are forced to shift toward each other to cinch the fabric of the hood portion to ensure a tight fit around the head. When tension is released, the fabric of the hood portion returns to its original position or resting state to loosen the fit.

Figure 20:
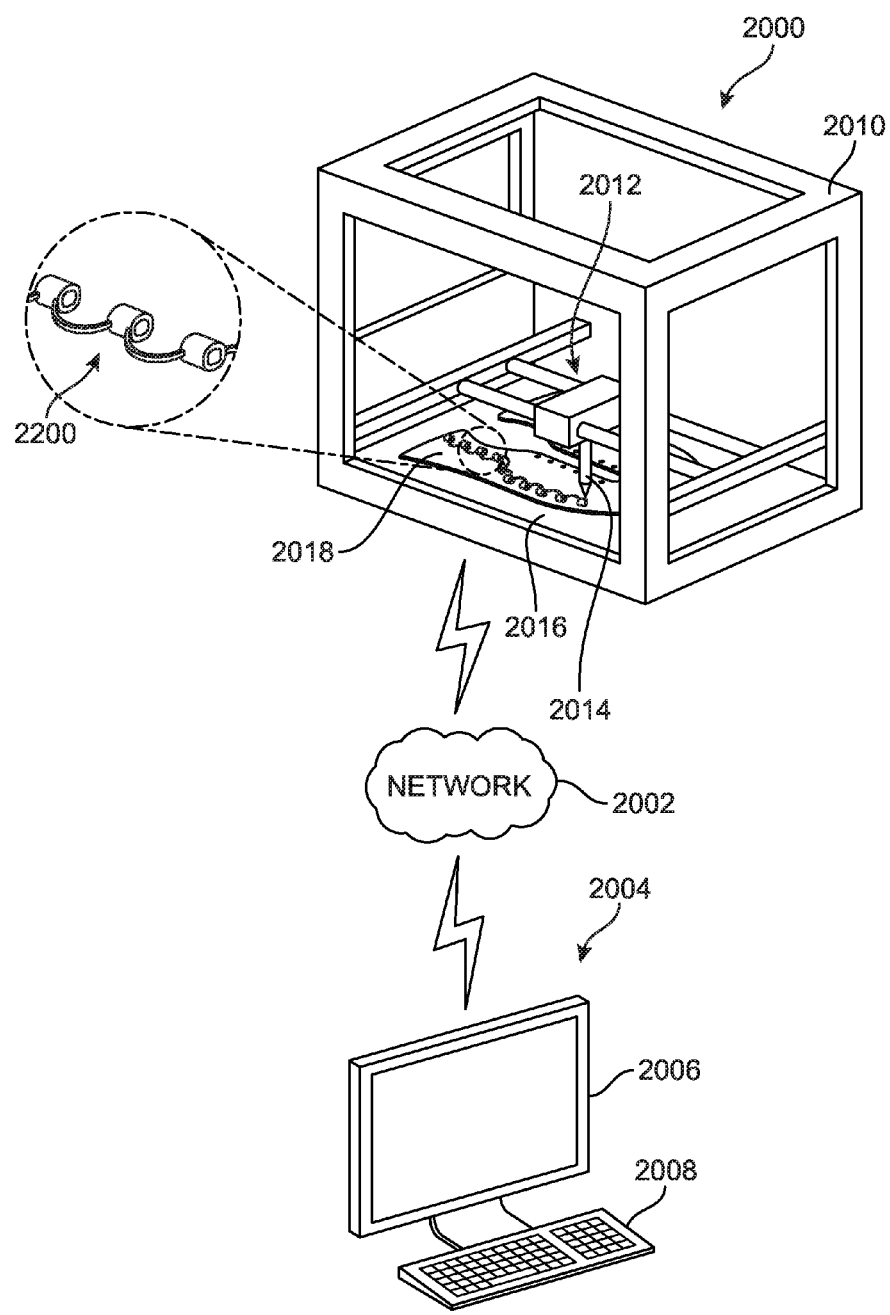
FIG. 20 illustrates a schematic view of forming an article with a tunnel spring structure using three-dimensional printing techniques, according to an embodiment.

The tunnel spring structure could be manufactured, formed, or printed using additive manufacturing device 2000, as shown in FIG. 20. The term "additive manufacturing," also referred to as "three-dimensional printing," refers to any device and technology for making a three-dimensional object through an additive process where layers of material are successively laid down under the control of computing system 2004. Exemplary additive manufacturing techniques that could be used include, but are not limited to, extrusion methods such as fused deposition modeling (FDM), electron beam freeform fabrication (EBF), direct metal laser sintering (DMLS), electron-beam melting (EBM), selective laser melting (SLM), selective heat sintering (SHS), selective laser sintering (SLS), plaster-based 3D printing, laminated object manufacturing (LOM), stereolithography (SLA), and digital light processing (DLP). In one embodiment, additive manufacturing device 2000 could be a fused deposition modeling type printer configured to print thermoplastic materials such as acrylonitrile butadiene styrene (ABS) or polyactic acid (PLA).

An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices, and methods disclosed in the 3D Objects application.

Additive manufacturing device 2000 may be used to manufacture one or more components used in forming an article. For example, additive manufacturing device 2000 may be used to form a tubular structure on an upper.

Referring to FIG. 20, additive manufacturing device 2000 may include device housing 2010, actuating assembly 2012, and extrusion head 2014. Additive manufacturing device 2000 may also include platform 2016. In some cases, extrusion head 2014 may be translated via actuating assembly 2012 on a z-axis (i.e., vertical axis), while platform 2016 of additive manufacturing device 2000 may move in the x and y directions (i.e., horizontal axis). In other cases, extrusion head 2014 could have full three-dimensional movement (e.g., x-y-z movement) above a fixed platform.

Embodiments can include provisions for controlling additive manufacturing device 2000, as well as processing information related to the formation of the tunnel spring structure. These provisions can include computing system 2004 and network 2002. Generally, the term "computing system" refers to the computing resources of a single computer, a portion of the computing resources of a single computer, and/or two or more computers in communication with one another. Any of these resources can be operated by one or more human users. In some embodiments, computing system 2004 may include one or more servers. In some cases, a separate server (not shown) may be primarily responsible for controlling and/or communicating with additive manufacturing device 2000, while a separate computer (e.g., desktop, laptop, or tablet) may facilitate interactions with a user or operator. Computing system 2004 can also include one or more storage devices including, but not limited to, magnetic, optical, magneto-optical, and/or memory, including volatile memory and non-volatile memory.

Computing system 2004 may comprise viewing interface 2006 (e.g., a monitor or screen), input devices 2008 (e.g., keyboard and/or mouse), and software for designing a computer-aided design ("CAD") representation of a three-dimensional model. In at least some embodiments, the CAD representation can provide a representation of an article as well as representations of elements of a tunnel spring structure, such as tubular structures and connecting portions.

In some embodiments, computing system 2004 may be in direct contact with one or more devices or systems of additive manufacturing device 2000 via network 2002. The network may include any wired or wireless provisions that facilitate the exchange of information between computing system 2004 and additive manufacturing device 2000. In some embodiments, network 2002 may further include various components such as network interface controllers, repeaters, hubs, bridges, switches, routers, modems, and firewalls. In some cases, the network may be a wireless network that facilitates wireless communication between two or more systems, devices, and/or components of additive manufacturing device 2000. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, the network could be a wired network including networks whose signals are facilitated by twister pair wires, coaxial cables, and optical fibers. In still other cases, a combination of wired and wireless networks and/or connections could be used.

A user may use a CAD system (e.g., CAD software) to design a customized path for a tunnel spring structure around upper 2018. Upper 2018 could be any base layer of any article of footwear or article of apparel. Embodiments may utilize any standard CAD or other software tool to design a particular tunnel spring structure geometry.

As it may be desirable to avoid applying pressure directly to certain parts of the foot, a path for the tunnel spring structure may be configured to travel around these regions, rather than across or through them. In some embodiments, some of the design steps may be automated. For example, in some cases, the task of designing a customized contoured path could be automatically done by a customization system. In other words, in some embodiments, the system may automatically generate a customized path or three-dimensional geometry for a tunnel spring structure on an article based on input information such as customized foot geometry and/or pressure distribution information.

Once a desired contoured path for the tunnel spring structure has been designed, a user may submit the tunnel spring structure design to additive manufacturing device 2000 for printing onto upper 2018. In some cases, information related to the tunnel spring structure can be provided to additive manufacturing device 2000 in the form of a 3D printing file format. In one embodiment, for example, the tunnel spring structure and/or information associated with the tunnel spring structure could be provided to additive manufacturing device 2000 in an STL file format, which is a Stereolithography file format for 3D printing. In other embodiments, the information could be stored and/or transferred in the Additive Manufacturing File Format (AMF), which is an open standard for 3D printing information. Still other embodiments could store and/or transfer information using the X3D file format. In still other embodiments, any other file formats known for storing 3D objects and/or 3D printing information could be used.

FIG. 20 illustrates an embodiment of a step of printing a tubular structure and connecting portion in a contoured path onto upper 2018. In particular, extrusion head 2014 may deposit a printable material onto the surface of upper 2018 to form tunnel spring structure 2200. A tubular structure with a hollow tunnel could be formed using a variety of different techniques. Embodiments could utilize any of the methods, processes, materials, and/or systems for printing tubular structures with a hollow tunnel onto an article that are disclosed in U.S. Patent Application No. 62/263,834, filed Dec. 7, 2015, titled "Three Dimensional Printing Utilizing a Captive Element," which is herein incorporated by reference in its entirety and hereafter referred to as the "captive element application." Any known materials for three-dimensional printing could be used, including any of the printable materials described above.

Figure 21:
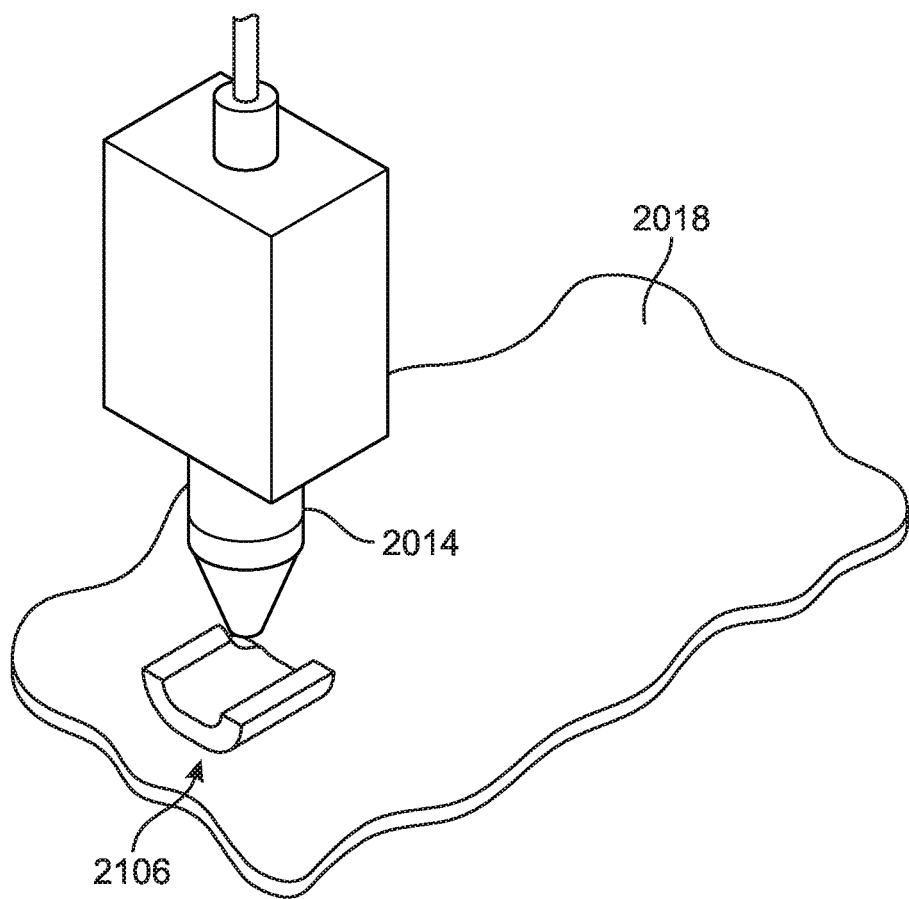
FIG. 21 illustrates an embodiment of printing the bottom portion of a tubular structure.

FIGS. 21-30 illustrate an embodiment of a method of printing or forming tubular structures and connecting portions. In FIG. 21, first bottom portion 2106 of a first tubular structure could be printed directly onto upper 2018 to form the bottom layer of the first tubular structure. Extrusion head 2014 could extract any material discussed above to form the bottom layer of the first tubular structure.

Figure 22:
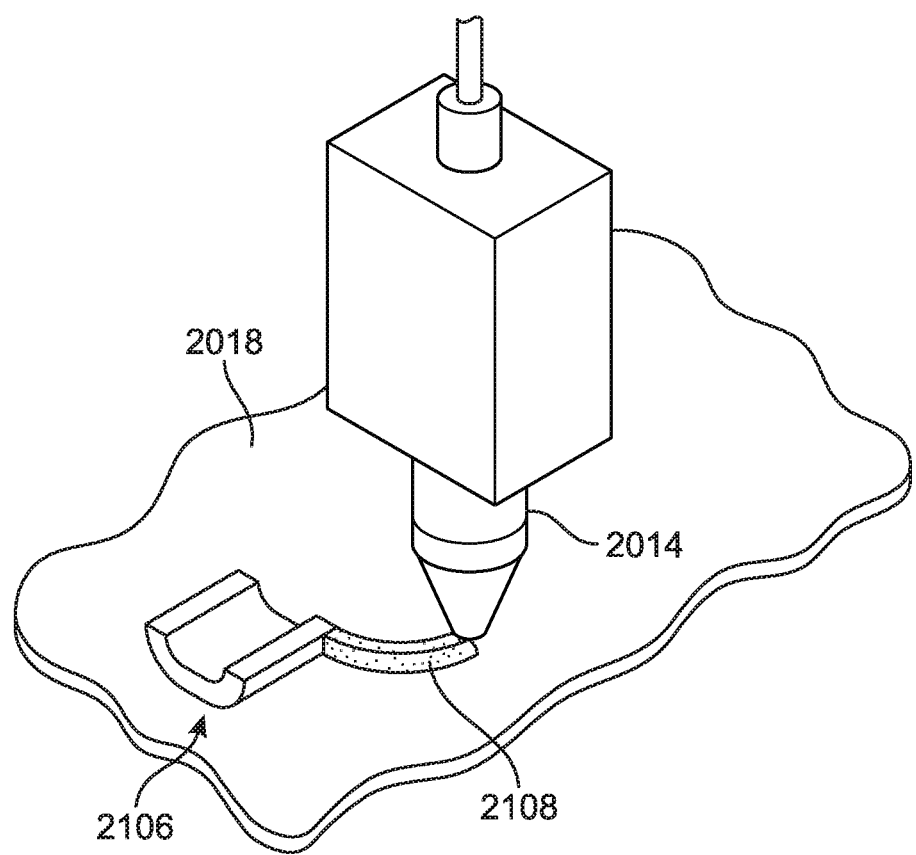
FIG. 22 illustrates printing a support portion of a tunnel spring structure.

FIG. 22 illustrates extrusion head 2014 depositing first support portion 2108 onto upper 2018. First support portion 2108 is formed in substantially the same shape and form of a connecting portion. First support portion 2108 is used as a scaffolding or support layer for connecting portions. After the tubular structures and connecting portions are formed, the support portion could be removed.

The support portion could be any material that could be removed or dissolved after a structure has been printed or formed. The support portion could be a water soluble plastic such as poly-vinyl alcohol (PVA), High Impact Polystyrene (HIPS), or any other support material or filament that could be removed or dissolvable after printing of the tubular structures and connecting portions. The PVA used as a spacer or support material for the connecting portion could be dissolved in warm water so that the flexible properties of the connecting portion could be utilized. In other embodiments, HIPS could be used as a scaffolding or support portion for the connecting portions and dissolved in various solvents, such as, Limonene. It will be understood that any dissolvable material could be used to form the support portions and any solvent or liquid could be used to remove the support portion from the tunnel spring structure.

Figure 23:
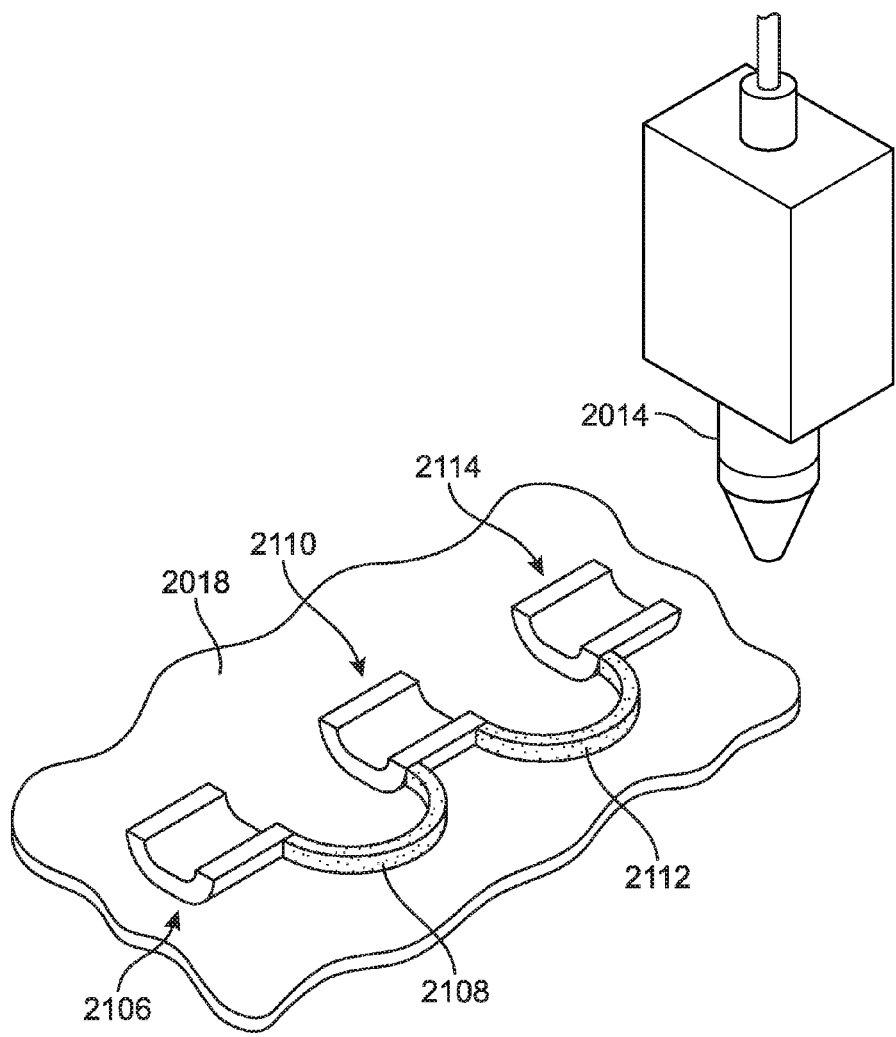
FIG. 23 illustrates printing a bottom layer of a tunnel spring structure.

FIG. 23 illustrates a bottom layer of the tunnel spring structure. Extrusion head 2014 could deposit material to form first bottom portion 2106 of the first tubular structure, first support portion 2108, second bottom portion 2110 of a second tubular structure, second support portion 2112, and third bottom portion 2114 of a third tubular structure. It will be understood that different materials could be deposited from extrusion head 2014 or multiple extrusion heads could be used with each depositing a different material.

Figure 24:
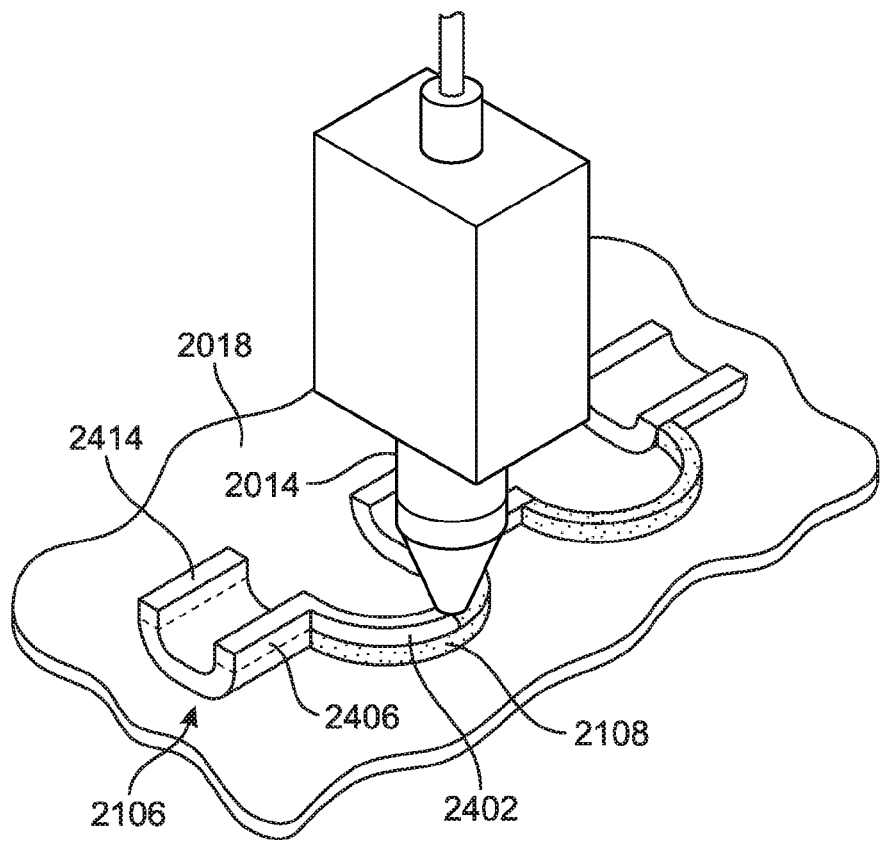
FIG. 24 illustrates printing side portions of a tubular structure and connecting portions.
Figure 25:
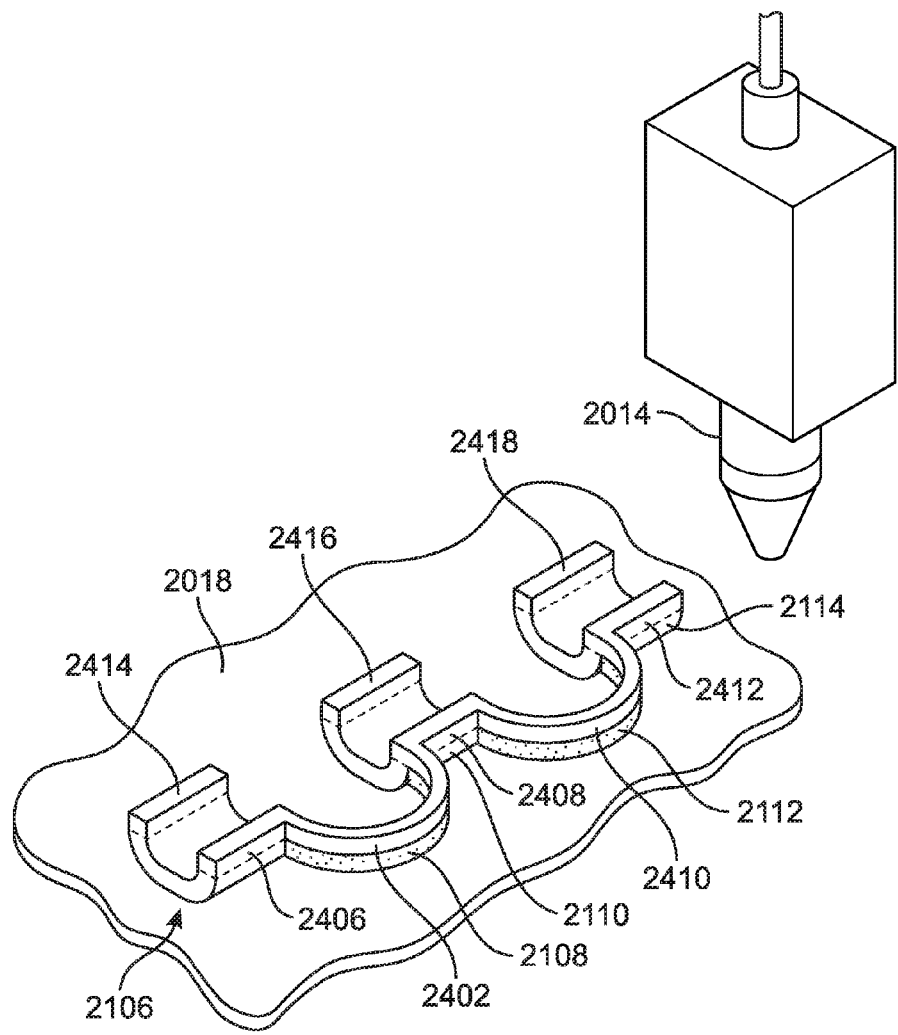
FIG. 25 illustrates the completion of printing the side portions of a tubular structure and connecting portions.

FIG. 24 illustrates the next step of printing the sides of the tubular structures and the connecting portions. First side portion of 2406 of the first tubular structure and second side portion 2414 of the first tubular structure could be printed on top of first bottom portion 2106 of the first tubular structure. First connecting portion 2402 could be printed on top of first support portion 2108. FIG. 25 illustrates the completed step of printing the sides of the tubular structures and the connecting portions. First side portion 2408 of the second tubular structure and second side portion 2416 of the second tubular structure could be printed onto the second bottom portion 2110 of the second tubular structure. Second connecting portion 2410 could be printed on top of second support portion 2112. Then, first side portion 2412 of the third tubular structure and second side portion 2418 of the third tubular structure could be printed on top of third bottom portion 2114 of the third tubular structure.

Figure 26:
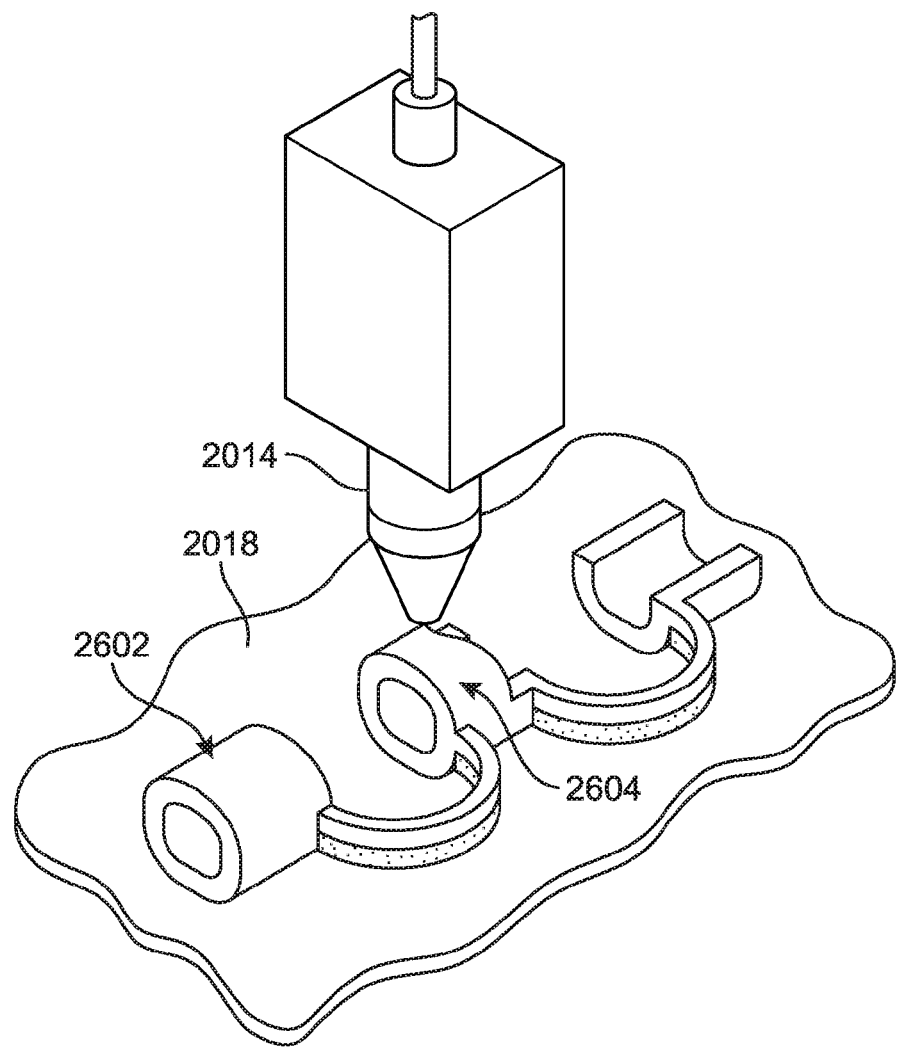
FIG. 26 illustrates printing top portions of a tubular structure.
Figure 27:
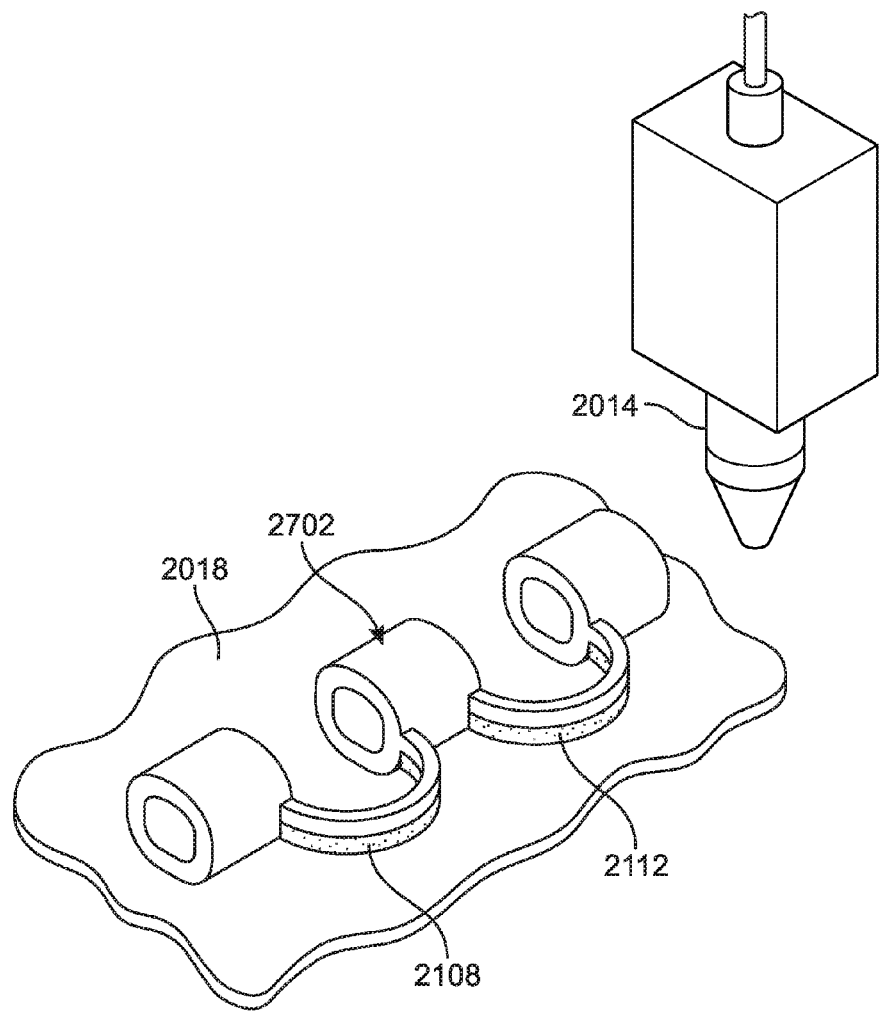
FIG. 27 illustrates a printed tunnel spring structure with support portions.

FIG. 26 illustrates forming the top portions of the tubular structures. First top portion 2602 could be formed on top of the side portions of the first tubular structure and second top portion 2604 could be formed on top of the side portions of the second tubular structure. Although not shown, the top portion of the third tubular structure could be formed at this stage. As shown in FIG. 27, tunnel spring structure 2702 has completed tubular structures and connecting portions with first support portion 2108 and second support portion 2112. The tubular structures have a geometry including a hollow inner portion.

Figure 28:
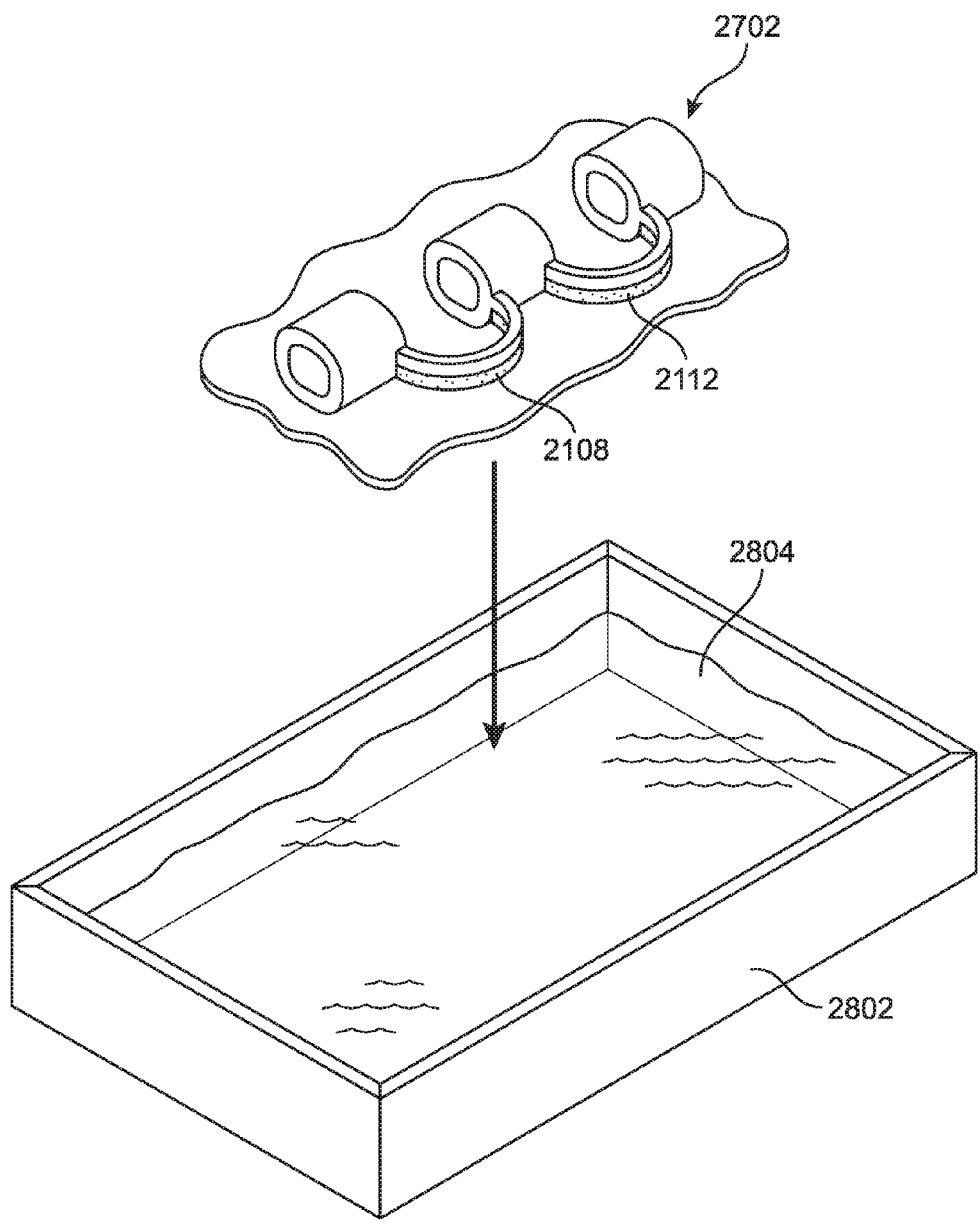
FIG. 28 illustrates a solvent used to remove the support portions.
Figure 29:
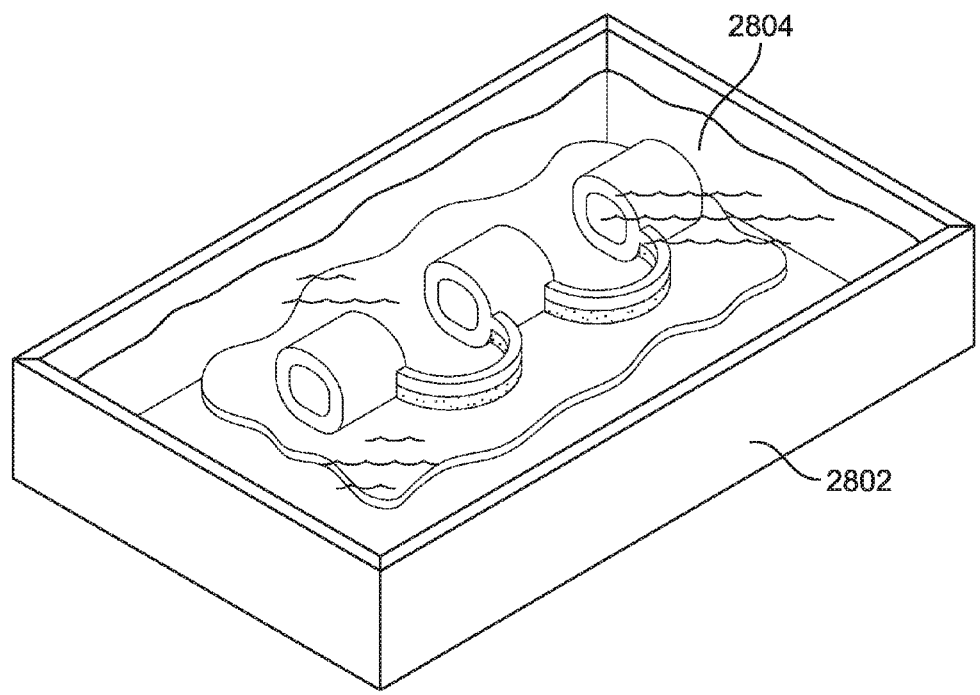
FIG. 29 illustrates the article placed in the solvent.
Figure 30:
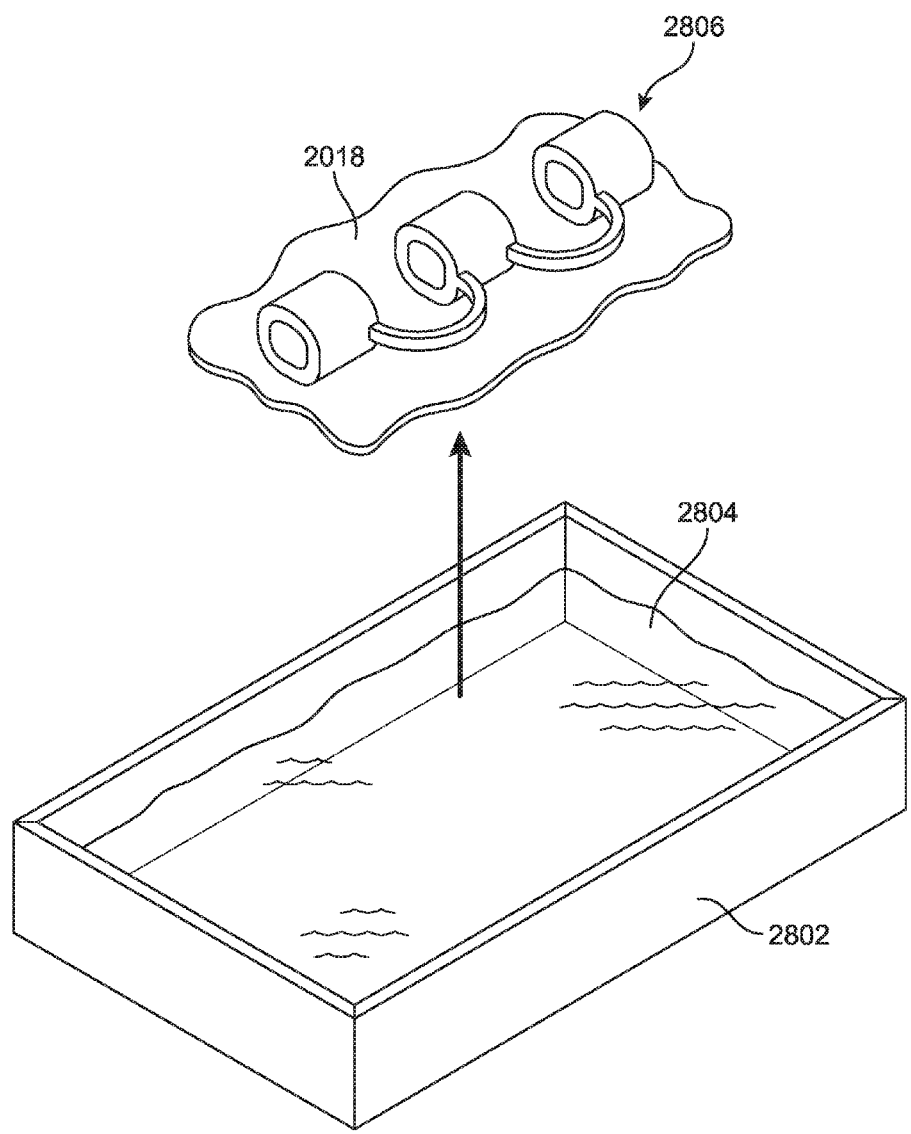
FIG. 30 illustrates removing the article from the solvent.

FIGS. 28-30 illustrate a method of dissolving the scaffolding portion of tunnel spring structure 2702. In FIG. 28, container 2802 holds dissolving liquid 2804 that can remove a support material or scaffolding portion from a structure. Container 2802 could be any container or holding device made of metal, plastic, or any material capable of holding a liquid or solvent. Container 2802 could be any shape, size, or geometry to accommodate an article of apparel or article of footwear or any portion of an article. As discussed above, dissolving liquid 2804 could be any liquid or solvent used to remove support material. In the exemplary embodiment, first support portion 2108 and second support portion 2112 could be removed by dissolving liquid 2804.

In FIG. 29, a tunnel spring structure that is printed on an upper is placed into the dissolving liquid 2804 for a period of time determined by the dissolving material and the dissolving liquid. The density and the amount of the dissolving material could be determining factors on the length of time the tunnel spring structure and upper should be left in the dissolving material.

Once the support material has been completely removed or dissolved, upper 2018 could be removed from dissolving liquid 2804 as shown in FIG. 30. Tunnel spring structure 2806 includes tubular structures and connecting portions without first support portion 2108 and second support portion 2112.

Figure 31:
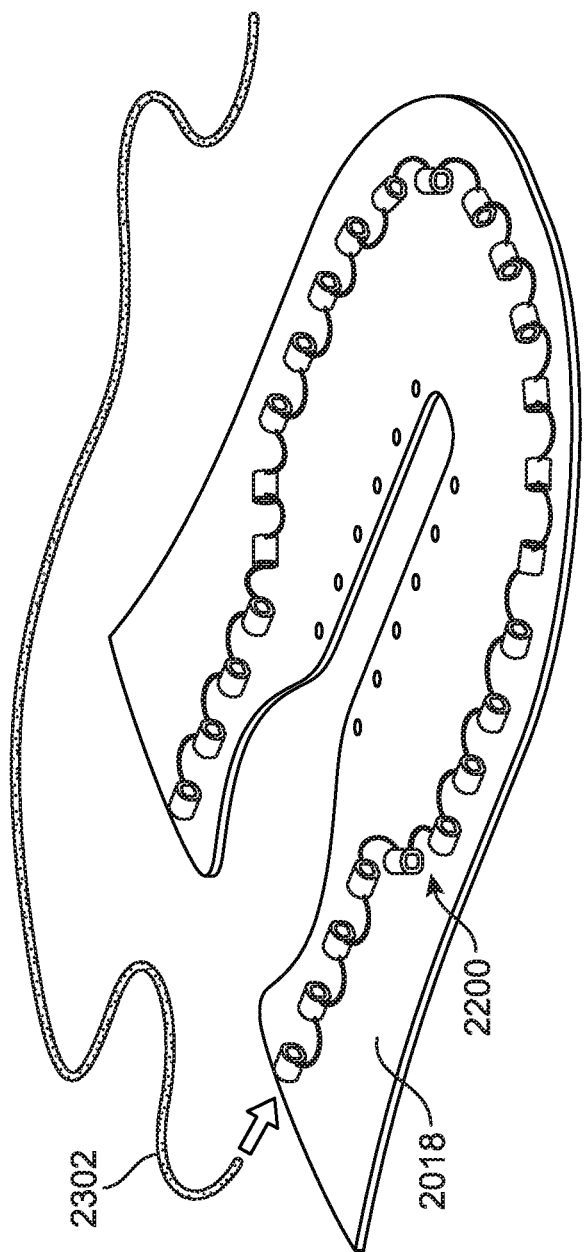
FIG. 31 is a schematic view of a tensile strand placed in a tunnel spring structure printed on an upper.

FIG. 31 illustrates tunnel spring structure 2200 formed or printed onto upper 2018 as discussed above. After tunnel spring structure 2200 has been printed, tensile strand 2302 may be inserted into the tunnel spring structure 2200. Tensile strand 2302 may be moveable or slidable through each tubular structure as tension is applied to tensile strand 2302.

Figure 32:
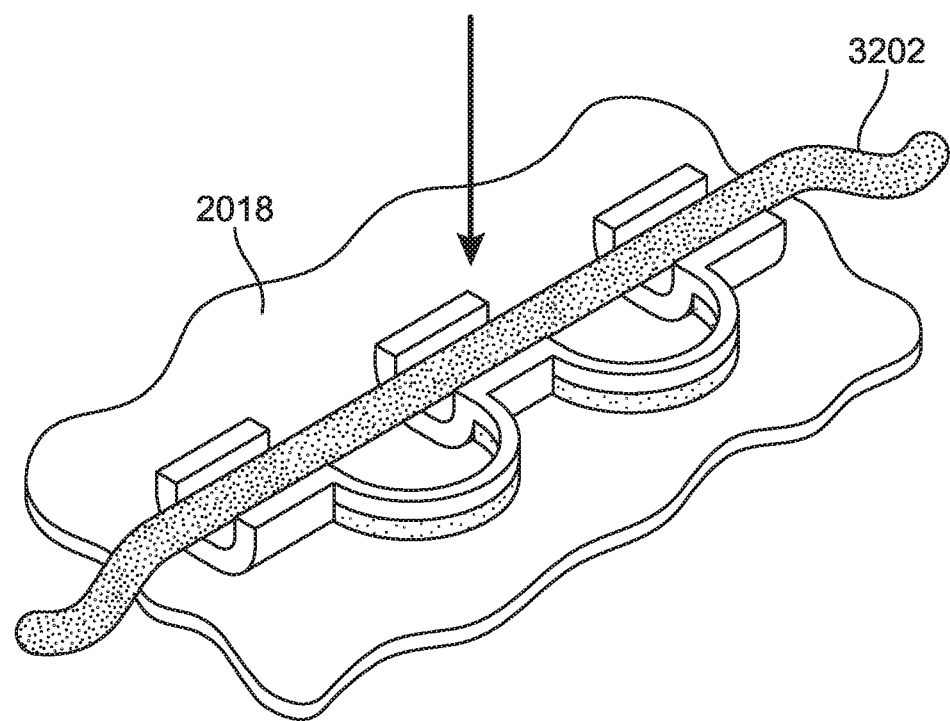
FIG. 32 illustrates another embodiment of printing a tunnel spring structure by placing a tensile strand on the bottom portions of the tubular structures.
Figure 33:
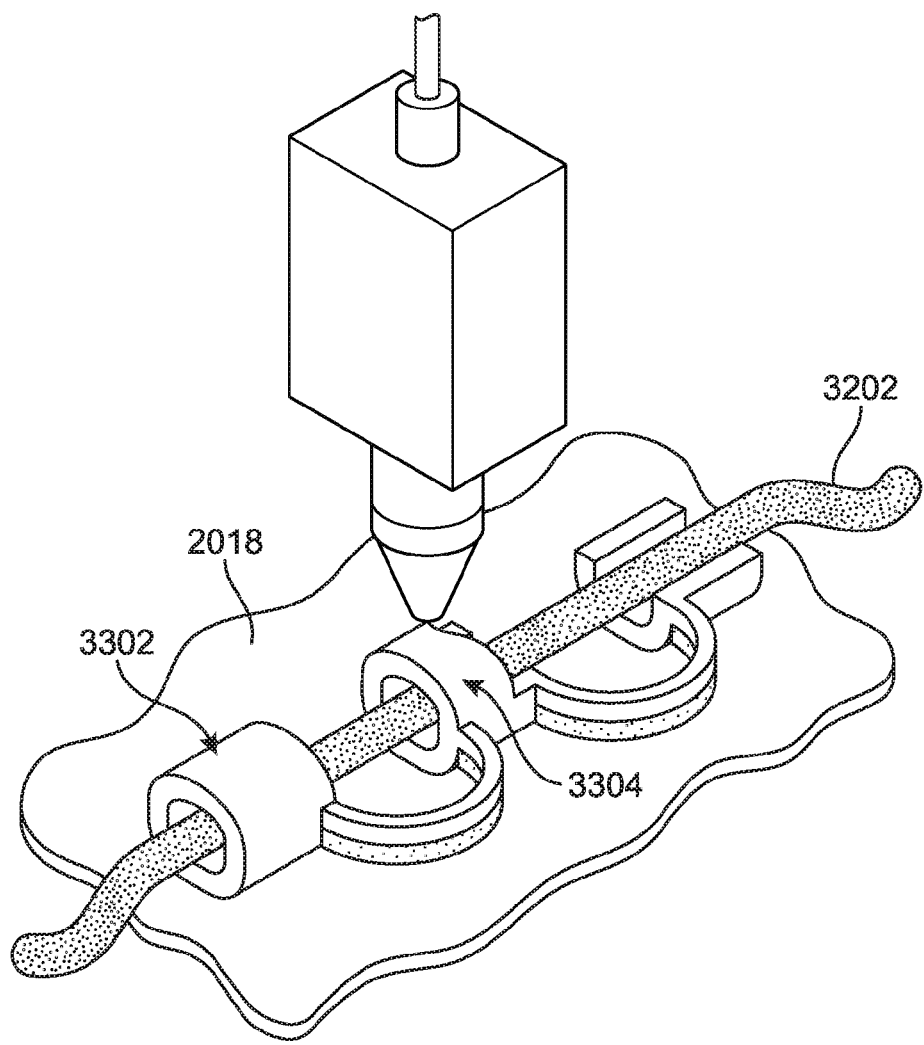
FIG. 33 illustrates printing the top portions of the tubular structures around the tensile strand.
Figure 34:
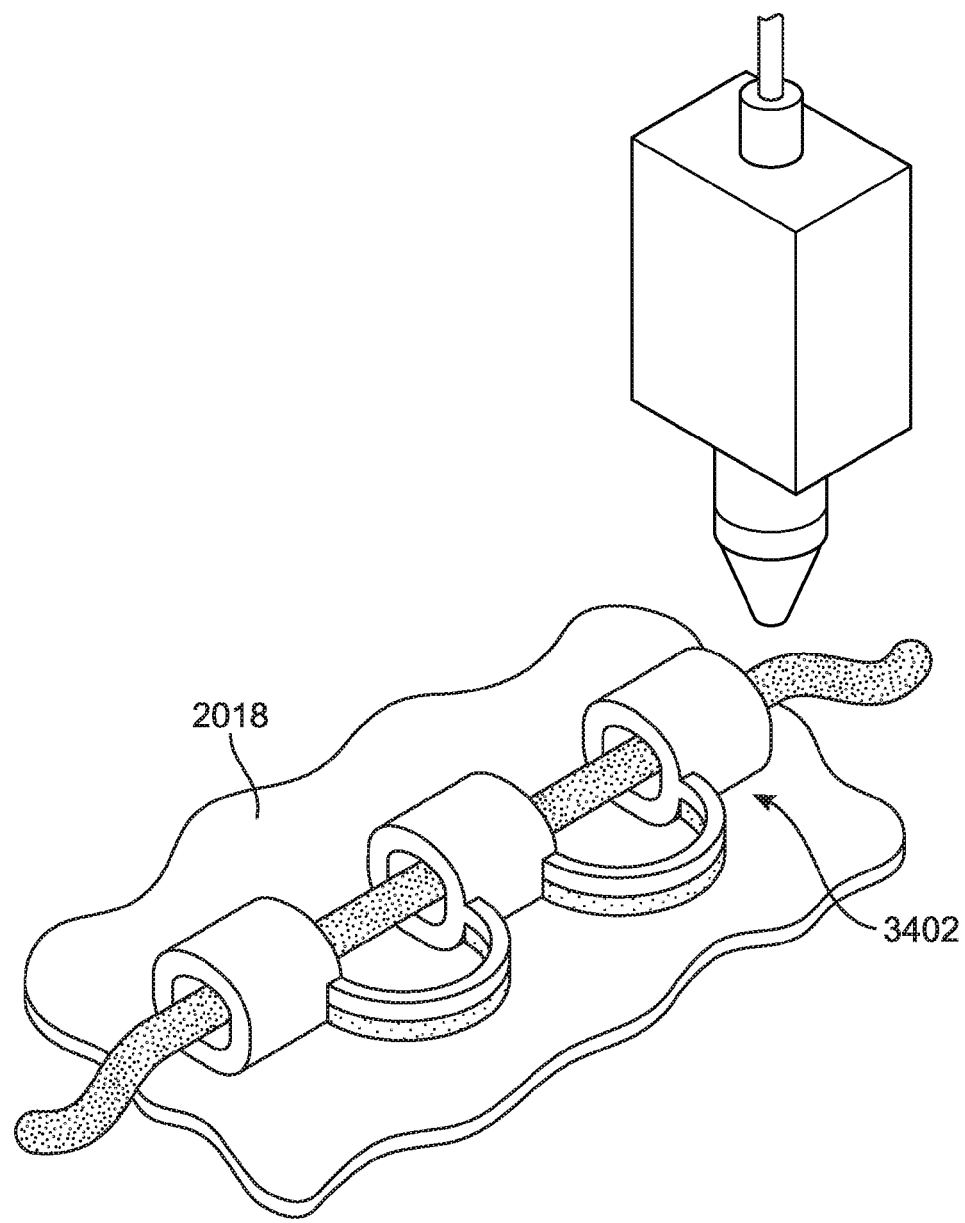
FIG. 34 illustrates a printed tunnel spring structure with support portions and the tensile strand.

FIGS. 32-34 illustrate another embodiment of forming or printing a tunnel spring structure onto upper 2018. In this embodiment, tensile strand 3202 is placed on the bottom portions of the tubular structures. FIG. 32 illustrates placing tensile strand 3202 on the bottom portions of the tubular structures before the tubular structures are completely formed. After the side portions of the tubular structures and the connecting portions are formed, tensile strand 3202 could be placed on the bottom portions of the tubular structures.

FIG. 33 illustrates first top portion 3302 of first tubular structure formed around tensile strand 3202 and second top portion 3304 of second tubular structure formed around tensile strand 3202. Tensile strand 3202 is embedded during the printing process. FIG. 34 illustrates tunnel spring structure 3402 including the tubular structures, the connecting portions, the support portions, and the tensile strand. The tensile strand may be moveable or slidable through each tubular structure as tension is applied to the tensile strand. The dissolving process discussed above in FIGS. 28-30 could be used to remove or dissolve the support portions of tunnel spring structure 3402.

Figure 35:
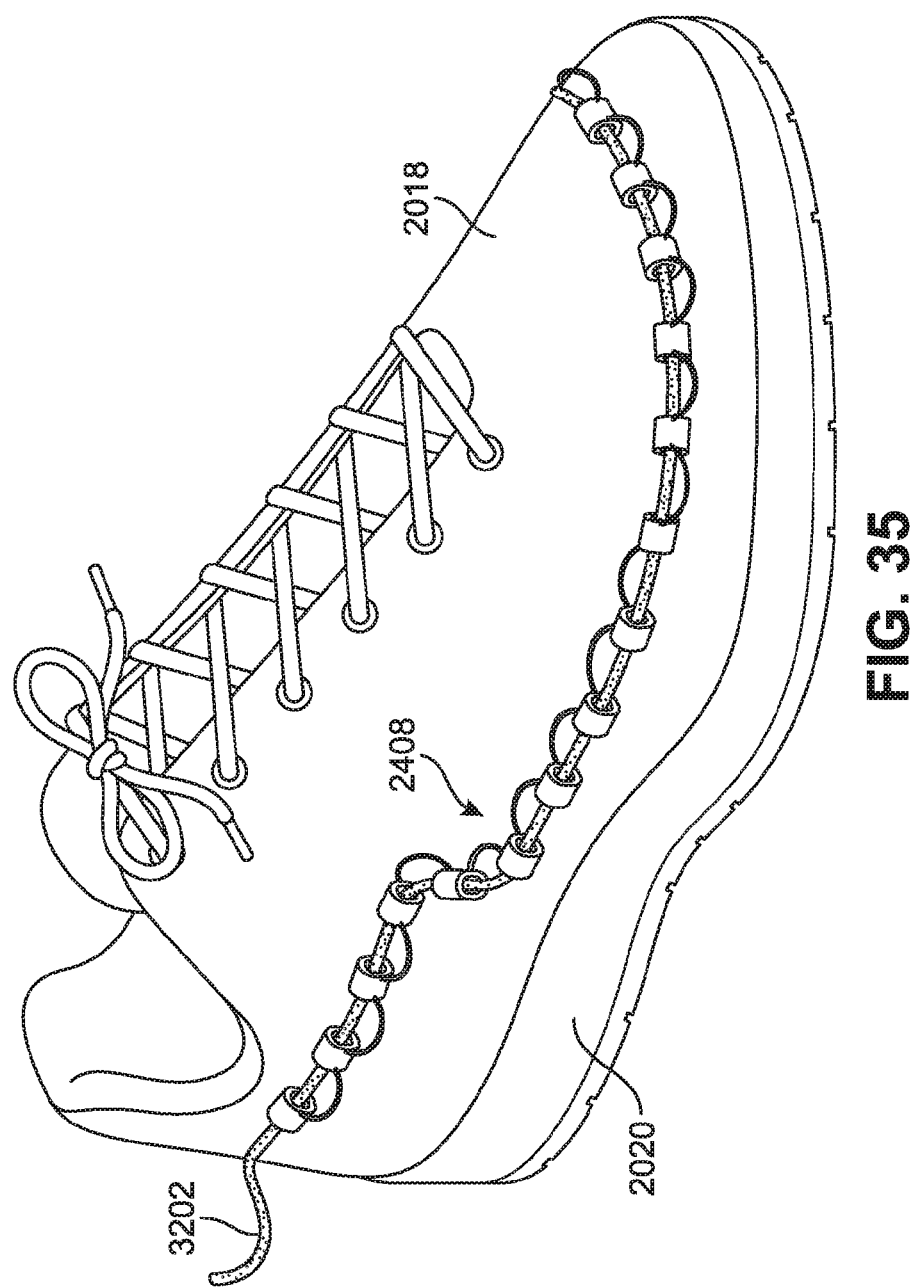
FIG. 35 is a schematic view of an article of footwear including a tunnel spring structure with the tensile strand.

FIG. 35 illustrates an exemplary embodiment of a final product produced by at least one of the processes described above. Upper 2018 has been reshaped to form an upper and assembled with sole structure 2020. As shown, tunnel spring structure 2408 has a nonlinear path on upper 2018 that has been created to bypass sensitive anatomical features or regions.

Figure 36:
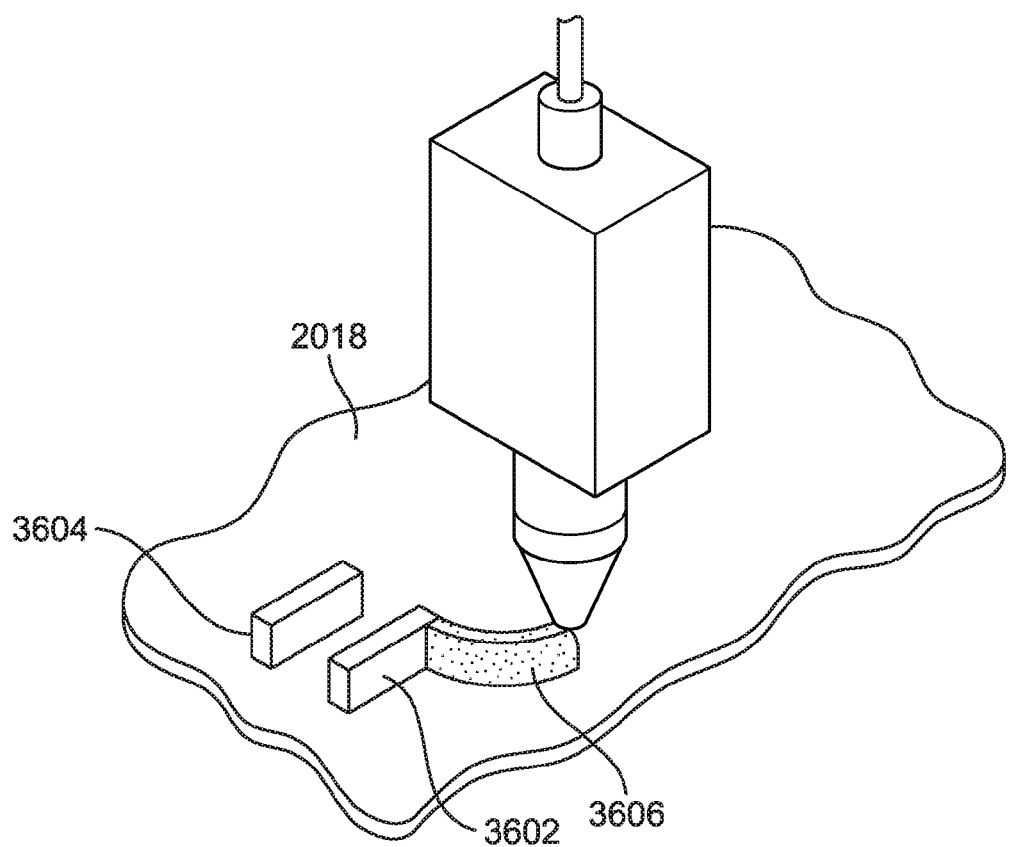
FIG. 36 illustrates another embodiment of printing a tunnel spring structure by printing the side portions and the support portions of the tubular structures directly onto the base layer.

FIGS. 36-40 illustrate another embodiment of forming or printing a tunnel spring structure onto upper 2018. In this embodiment, the side portions of the tubular structures could be formed directly onto the upper. FIG. 36 illustrates first lower side portion 3602 of first tubular structure and second lower side portion 3604 of the first tubular structure formed directly onto upper 2018. In this embodiment, bottom portions of the tubular structures are not required. First support portion 3606 could be formed directly onto upper 2018 to support a connecting portion.

Figure 37:
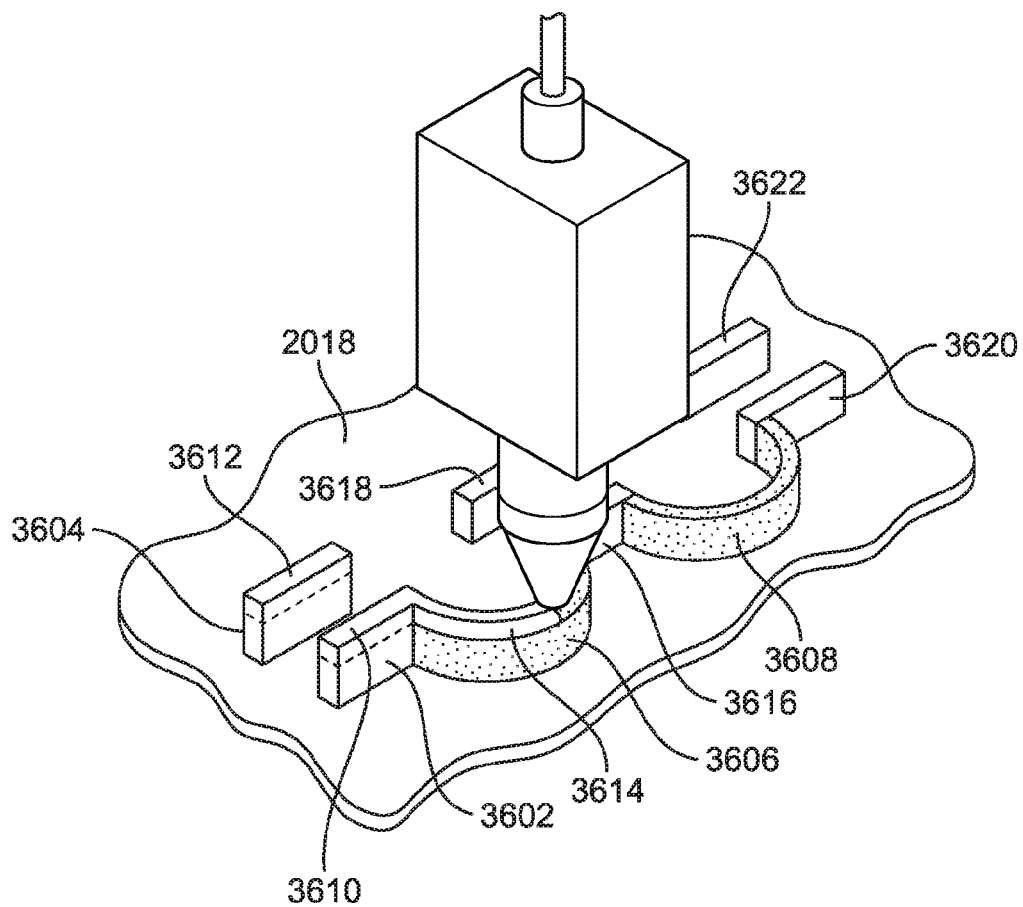
FIG. 37 illustrates printing upper side portions of the tubular structures and the connecting portions.

FIG. 37 illustrates forming first lower side portion 3616 of the second tubular structure and second lower side portion 3618 of the second tubular structure directly onto upper 2018. Second support portion 3608 could be formed to support a connecting portion. First lower side portion 3620 of the third tubular structure and second lower side portion 3622 of the third tubular structure could be directly formed onto upper 2018. In FIG. 37, upper side portions of the tubular structures and the connecting portions could be printed on top of the lower side portions and the support portions, respectively. First upper side portion 3610 of the first tubular structure could be printed on top of first lower side portion 3602 of the first tubular structure and second upper side portion 3612 of the first tubular structure could be printed on top of second lower side portion 3604. First connecting portion 3614 could be printed on top of first support portion 3606.

Figure 38:
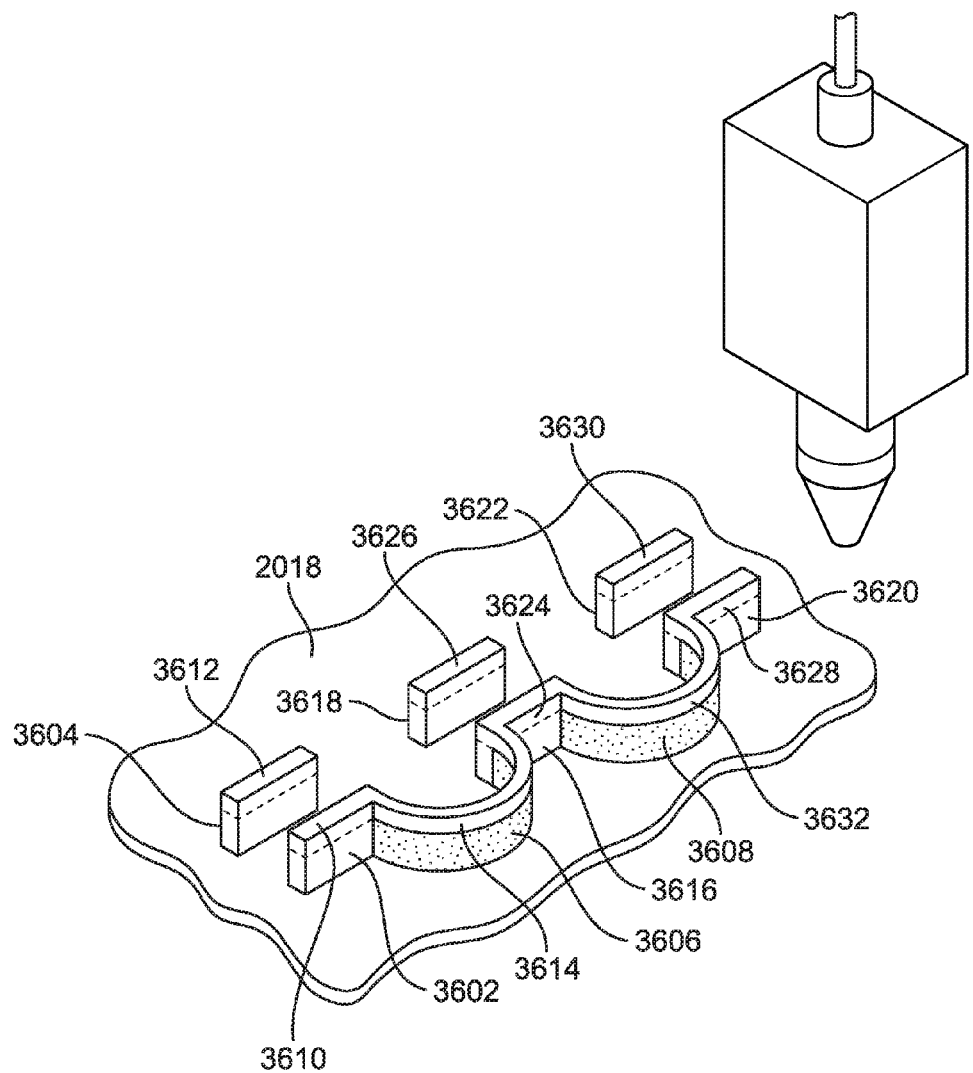
FIG. 38 illustrates the completion of printing the side portions of the tubular structures and the connecting portions.

FIG. 38 illustrates forming the upper side portions of the second tubular structure and the third tubular structure, and the second connecting portion. First upper side portion 3624 of the second tubular structure could be printed on top of first lower side portion 3616 of the second tubular structure and second upper side portion 3626 of the second tubular structure could be printed on top of second lower side portion 3618 of the second tubular structure. Second connecting portion 3632 could be printed on top of second support portion 3608. First upper side portion 3628 of the third tubular structure could be printed on top of first lower side portion 3620 of the third tubular structure and second upper side portion 3630 of the third tubular structure could be printed on top of second lower side portion 3622 of the third tubular structure.

Figure 39:
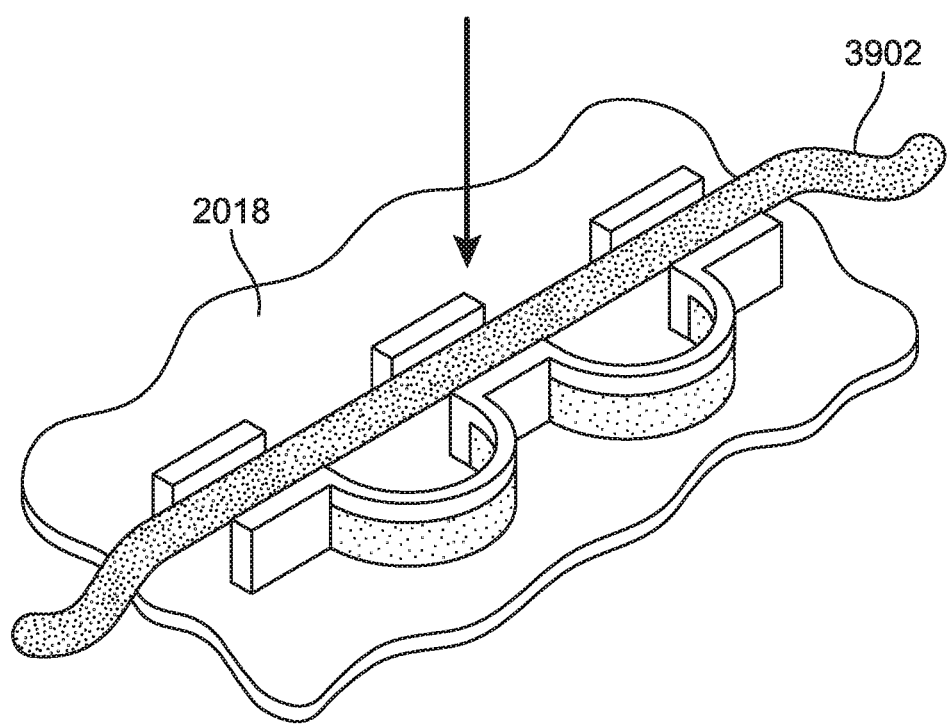
FIG. 39 illustrates placing the tensile strand directly onto the base layer.
Figure 40:
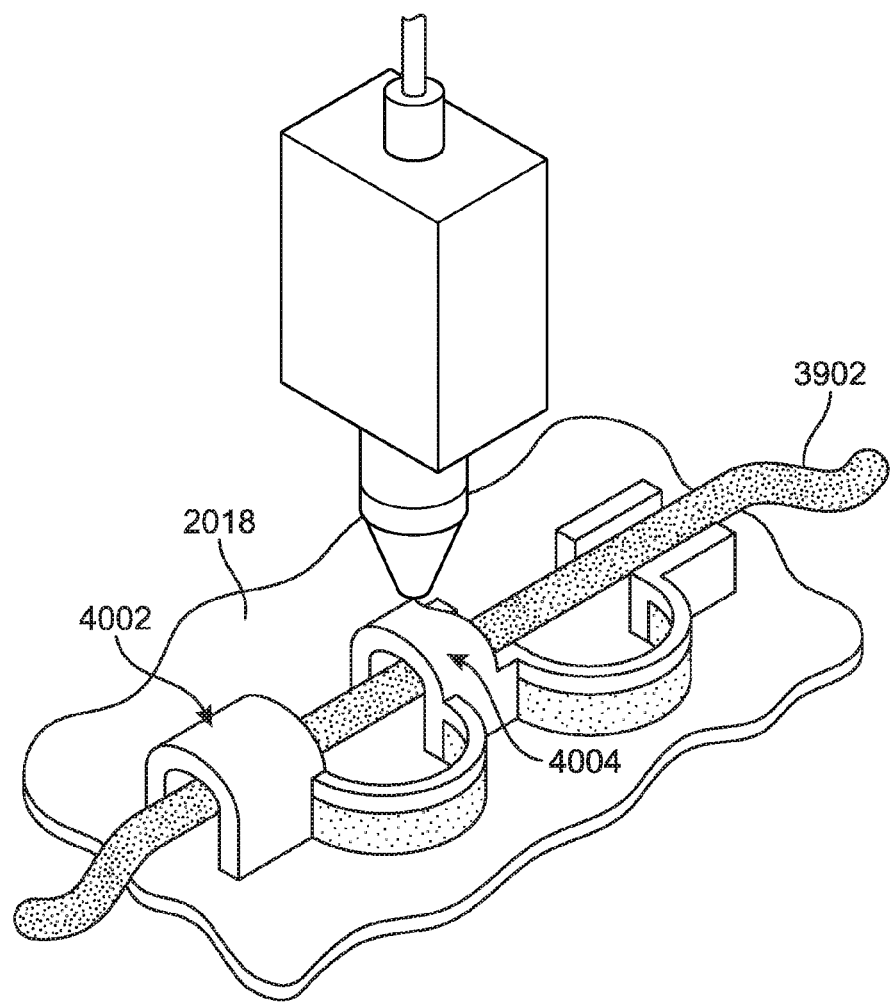
FIG. 40 illustrates printing the top portions of the tubular structures around the tensile strand.

FIG. 39 illustrates placing tensile strand 3902 directly onto upper 2018 prior to forming the tubular structures. Tensile strand 3902 may be moveable or slidable through each tubular structure as tension is applied to tensile strand 3902. FIG. 40 illustrates forming first top portion 4002 of the first tubular structure around tensile strand 3902 and forming second top portion 4004 of the second tubular structure around tensile strand 3902. The top portion of the third tubular structure could be formed around tensile strand 3902 to provide a tunnel spring structure having side portions directly formed onto upper 2018. The dissolving process discussed above in FIGS. 36-38 could be used to remove or dissolve first support portion 3606 and second support portion 3608.

It will be understood that a tensile strand could be placed into the tunnel spring structure after the tubular structures are formed as shown in FIG. 31. A tensile strand could be in direct contact with an upper. In other embodiments, the tensile strand could be placed directly on the upper and the tubular structures formed around the tensile strand.

While various embodiments have been described, the description is intended to be exemplary, rather than limiting, and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A tunnel spring structure attached to a base layer of an article of footwear or an article of apparel, the tunnel spring structure comprising:
    a plurality of tubular structures with each tubular structure including a first end and a second end, wherein each tubular structure has a tunnel;
    a plurality of flexible connecting portions with each connecting portion including a third end and a fourth end;
    wherein the second end of a first tubular structure of the plurality of tubular structures is attached to the third end of a first connecting portion of the plurality of connecting portions; and
    wherein the first end of a second tubular structure of the plurality of tubular structures is attached to the fourth end of the first connecting portion.

2. The tunnel spring structure according to claim 1, further comprising a tensile strand having a first end and a second end, the tensile strand extending through the tunnels of the plurality of tubular structures;
    wherein the first end of the tensile strand is secured at the first end of the first tubular structure; and
    wherein the tensile strand is partially exposed proximate each of the plurality of connecting portions.

3. The tunnel spring structure according to claim 2, wherein tension applied to the second end of the tensile strand urges one or more of the plurality of tubular structures to deviate from a first state to a second state;
    wherein the plurality of tubular structures are spaced apart a first distance when the tunnel spring structure is in the first state;
    wherein the plurality of tubular structures are spaced apart a second distance when the tunnel spring structure is in the second state; and
    wherein the first distance is greater than the second distance.

4. The tunnel spring structure according to claim 3, wherein when the tension is released, the plurality of connecting portions urge the tunnel spring structure from the second state to the first state.

5. The tunnel spring structure according to claim 3, wherein the tensile strand is a cord.

6. The tunnel spring structure according to claim 3, wherein the plurality of connecting portions is elastic.

7. The tunnel spring structure according to claim 1, wherein the plurality of connecting portions have arc-like shapes protruding away from one or more of the plurality tubular structures.

8. The tunnel spring structure according to claim 1, wherein
    at least one of the tubular structures of the plurality of tubular structures has a greater stiffness than at least one of connecting portions of the plurality of connecting portions.

9. The tunnel spring structure according to claim 1, wherein
    at least one of the plurality of tubular structures is made of a different material than at least one of the plurality of connecting portions.

10. The tunnel spring structure according to claim 1, wherein the tunnel spring structure is disposed on a portion of an article of apparel.

11. The tunnel spring structure according to claim 1, wherein the tunnel spring structure is disposed on a portion of an article of footwear.

12. A tunnel spring structure attached to a base layer of an article of footwear or an article of apparel, the tunnel spring structure comprising:
    a first tubular structure attached to the base layer including a first end portion and a second end portion, the first tubular structure having a first tunnel extending from the first end portion to the second end portion;
    a second tubular structure attached to the base layer including a third end portion and a fourth end portion, the second tubular structure having a second tunnel extending from the third end portion to the fourth end portion;
    a third tubular structure attached to the base layer including a fifth end portion and a sixth end portion, the third tubular structure having a third tunnel extending from the fifth end portion to the sixth end portion;
    a first connecting portion disposed between the first tubular structure and the second tubular structure, wherein the first connecting portion is attached to the second end portion of the first tubular structure and the third end portion of the second tubular structure;
    a second connecting portion disposed between the second tubular structure and the third tubular structure, wherein the second connecting portion is attached to the fourth end portion of the second tubular structure and the fifth end portion of the third tubular structure;
    a tensile strand including a first end and a second end, the tensile strand extending through the first tunnel, the second tunnel, and the third tunnel; and
    wherein the tensile strand is partially exposed proximate the first connecting portion and is also partially exposed proximate the second connecting portion, and the first connecting portion and the second connecting portion are flexible portions.

13. The tunnel spring structure according to claim 12, wherein the tunnel spring structure is configured in a non-linear shape.

14. The tunnel spring structure according to claim 13, wherein the tunnel spring structure is in a first state when the first tubular structure and the second tubular structure are spaced apart a first distance;
- wherein the tunnel spring structure is in a second state when the first tubular structure and the second tubular structure are spaced apart a second distance;
- wherein the first distance is greater than the second distance; and
- wherein a predetermined tension applied to the first end and the second end of the tensile strand forces the tunnel spring structure from the first state to the second state.

15. The tunnel spring structure according to claim 14, wherein when the predetermined tension is released, the first connecting portion and the second connecting portion force the tunnel spring structure from the second state to the first state.

16. The tunnel spring structure according to claim 12, wherein the first connecting portion is more flexible than the first tubular structure.

17. The tunnel spring structure according to claim 14, wherein the base layer has a geometry, and wherein the geometry of the base layer changes when the tunnel spring structure transitions from the first state to the second state.

18. The tunnel spring structure according to claim 12, wherein either or both of the first connecting portion and the second connecting portion have arc-like shapes protruding away from the second tubular structure.

* * * * *